United States Patent
Wu et al.

(10) Patent No.: US 10,833,321 B2
(45) Date of Patent: Nov. 10, 2020

(54) CATHODE MATERIALS FOR LITHIUM ION BATTERIES

(71) Applicant: UChicago Argonne, LLC, Chicago, IL (US)

(72) Inventors: Huiming Wu, Darien, IL (US); Khalil Amine, Oakbrook, IL (US); Jun Lu, Bolingbrook, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 48 days.

(21) Appl. No.: 14/641,003

(22) Filed: Mar. 6, 2015

(65) Prior Publication Data
US 2016/0260965 A1 Sep. 8, 2016

(51) Int. Cl.
| | |
|---|---|
| *H01M 4/36* | (2006.01) |
| *H01M 4/04* | (2006.01) |
| *H01M 4/1391* | (2010.01) |
| *H01M 4/139* | (2010.01) |
| *H01M 4/62* | (2006.01) |
| *H01M 10/0525* | (2010.01) |
| *H01M 4/525* | (2010.01) |
| *H01M 4/131* | (2010.01) |

(Continued)

(52) U.S. Cl.
CPC ......... *H01M 4/366* (2013.01); *H01M 4/0419* (2013.01); *H01M 4/0471* (2013.01); *H01M 4/139* (2013.01); *H01M 4/1391* (2013.01); *H01M 4/62* (2013.01); *C01G 45/02* (2013.01); *C01G 49/00* (2013.01); *C01G 49/02* (2013.01); *C01G 51/04* (2013.01); *C01G 51/42* (2013.01); *C01G 53/04* (2013.01); *C01G 53/42* (2013.01); *H01M 4/04* (2013.01); *H01M 4/131* (2013.01); *H01M 4/485* (2013.01); *H01M 4/505* (2013.01); *H01M 4/525* (2013.01); *H01M 10/0525* (2013.01); *Y02E 60/122* (2013.01)

(58) Field of Classification Search
CPC ........ H01M 4/04; H01M 4/366; H01M 4/505; H01M 4/525; H01M 4/485; H01M 4/62; H01M 10/00525; H01M 4/131; H01M 4/139; H01M 10/0525; H01M 4/0471; H01M 4/0419; H01M 4/1391; Y02P 70/54; Y02E 60/122; C01G 45/02; C01G 49/00; C01G 51/04; C01G 51/42; C01G 53/04; C01G 53/42; C02G 51/04
USPC .................................................... 429/232.95
See application file for complete search history.

(56) References Cited

U.S. PATENT DOCUMENTS

| | | | |
|---|---|---|---|
| 7,695,649 B2 | 4/2010 | Paulsen et al. | |
| 8,591,774 B2 | 11/2013 | Koenig et al. | |
| (Continued) | | | |

FOREIGN PATENT DOCUMENTS

WO   WO 2014/165378 A1 * 3/2014 ............. H01M 4/58

*Primary Examiner* — Jonathan G Jelsma
*Assistant Examiner* — Omar M Kekia
(74) *Attorney, Agent, or Firm* — Foley & Lardner LLP

(57) ABSTRACT

A process of forming a coated cathode active material include preparing a cathode material precursor by co-precipitation; coating the cathode material precursor with an electrochemically inert coating material precursor by precipitation to form a coated cathode material precursor; lithiating the coated cathode material precursor with a lithium source material to form a lithiated coated cathode material precursor; and sintering the lithiated coated cathode material precursor to form a cathode active material coated with an electrochemically inert material.

21 Claims, 18 Drawing Sheets

(51) Int. Cl.
*H01M 4/485* (2010.01)
*H01M 4/505* (2010.01)
*C01G 53/00* (2006.01)
*C01G 49/02* (2006.01)
*C01G 49/00* (2006.01)
*C01G 45/02* (2006.01)
*C01G 53/04* (2006.01)
*C01G 51/04* (2006.01)
*C01G 51/00* (2006.01)

(56) References Cited

U.S. PATENT DOCUMENTS

| | | | | |
|---|---|---|---|---|
| 2008/0286460 A1* | 11/2008 | Onnerud | ............... | C01G 53/003 427/216 |
| 2009/0023069 A1* | 1/2009 | Tian | ............... | C04B 35/447 429/231.5 |
| 2010/0151332 A1* | 6/2010 | Lopez | ............... | H01M 4/131 429/231.95 |
| 2011/0076556 A1* | 3/2011 | Karthikeyan | ............... | H01M 4/366 429/188 |
| 2013/0037742 A1 | 2/2013 | Oda et al. | | |
| 2013/0175469 A1 | 7/2013 | Paulsen et al. | | |
| 2013/0202966 A1* | 8/2013 | Yu | ............... | H01M 4/131 429/223 |
| 2013/0209885 A1 | 8/2013 | Paulsen et al. | | |
| 2013/0337327 A1 | 12/2013 | Sun et al. | | |
| 2014/0087264 A1* | 3/2014 | Li | ............... | H01M 4/366 429/224 |
| 2014/0205750 A1* | 7/2014 | Yang | ............... | H01M 4/1391 427/126.4 |
| 2014/0205898 A1 | 7/2014 | Lee et al. | | |
| 2015/0016024 A1* | 1/2015 | Choi | ............... | H01G 11/50 361/505 |
| 2015/0024272 A1* | 1/2015 | Tsunozaki | ............... | H01M 4/505 429/223 |
| 2015/0044513 A1* | 2/2015 | Endoh | ............... | H01M 4/131 429/7 |
| 2015/0069293 A1* | 3/2015 | Park | ............... | C01G 53/006 252/182.1 |
| 2015/0104708 A1* | 4/2015 | Bi | ............... | H01M 4/525 429/220 |
| 2015/0111097 A1* | 4/2015 | Park | ............... | H01M 4/525 429/188 |

* cited by examiner

CATHODE MATERIALS FOR LITHIUM ION BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to cathodic materials for use in lithium ion batteries. In particular, the technology is related to coatings for cathodic materials and methods of preparing coated cathodic materials.

BACKGROUND

As lithium-ion batteries applications expand into smart mobile devices, power tools, (hybrid) electric vehicles, and energy storage systems, the demand for high-energy density/high-power density cells is rapidly growing. Among various attempts to meet this stringent requirement, charging cells at a voltage higher than the conventional cut-off at 4.2 V has been suggested to enhance the energy density of cells. Raising the charge cut-off voltage for the cathode material faces formidable challenges such as the deterioration of cell performance and lack of thermal stability.

One approach to address these issues facing the high-voltage cathode active materials is the surface coating of the cathode active material using electrochemically inert materials, such as $Al_2O_3$, $ZrO_2$, $ZnO$, $AlF_3$, $Ni_3(PO_4)_2$, and $AlPO_4$. In general, the coating layer has proven to be effective in improving cycle life and safety of the Li-ion cells. However, uniformity of the coating layers remains an issue; some parts of the active materials are covered by nanolayers, but others are directly exposed to the electrolyte, thereby giving rise to severe capacity fade.

SUMMARY

In one aspect, a process of forming a coated cathode active material is provided, the process may include: preparing a cathode material precursor by co-precipitation; coating the cathode material precursor with an electrochemically inert coating material precursor by precipitation to form a coated cathode material precursor; lithiating or sodiating the coated cathode material precursor with a lithium or sodium source material to form a lithiated or sodiated coated cathode material precursor; and sintering the lithiated or sodiating coated cathode material precursor to form a cathode active material coated with an electrochemically inert material. The preparing the cathode material precursor may include co-precipitation or spray-drying. The coating of the cathode material precursor may include co-precipitation or spray-drying.

In any of the above embodiments, the preparing the cathode material precursor may include providing an acidic solution of a metal ion and a basic solution and combining the basic solution and the acidic solution to effect co-precipitation of the cathode active material precursor as a particle. A concentration of the metal ion may be maintained at a substantially constant value during formation of the cathode active material precursor particle, such that the cathode active material precursor particle contains a substantially uniform metal concentration of the metal along a radius of the particle. Alternatively, a concentration of the metal ion may be increased or reduced during formation of the cathode active material precursor particle such that the cathode active material precursor contains an increasing or decreasing metal concentration along a radius of the particle.

In any of the above embodiments, the coating of the cathode material precursor with an coating material may include providing an acidic solution of a first coating material precursor and a basic solution; and combining the basic solution and the acidic solution to effect precipitation of a second coating material precursor; wherein the second coating material precursor precipitates as a layer coating on individual particles of the cathode material precursor to form the coated cathode material precursor. A concentration of the first coating material precursor in the acidic solution may be maintained at a substantially constant value such that the layer of the second coating material precursor has a substantially uniform composition along a radius of the layer. Alternatively, a concentration of the first coating material precursor in the acidic solution may be increased or reduced during precipitation of the second electrochemically inert material precursor such that the layer of the second coating material precursor has an increasing or decreasing concentration along a radius of the layer. In any of the above embodiments, the coating material precursor may be a precursor for an electrochemically active coating, and the cathode may be coated with the electrochemically active coating. In some embodiments, the coating material precursor may be a precursor for an electrochemically inert coating, and the cathode may be coated with the electrochemically inert coating.

In any of the above embodiments, the cathode active material precursor may include a metal hydroxide, a metal carbonate, a metal oxalate, or a metal phosphate. For example, the cathode active material precursor may include $Co(OH)_2$, $Ni(OH)_2$, $CoCO_3$, $MnCO_3$, $NiC_2O_4$, $FePO_4$, $Co_xNi_yMn_{1-x-y}(OH)_2$, $Co_xNi_yMn_{1-x-y}CO_3$, or $Co_xNi_yMn_{1-x-y}C_2O_4$.

In any of the above embodiments, the coating material precursor includes a metal hydroxide, a metal carbonate, a metal oxlate, a metal fluoride, a metal phosphate, or a metal oxyfluoride. For example, the coating material precursor may include $Al(OH)_3$, $Al_2(CO_3)_3$, $Al_2(C_2O_4)_3$, $AlF_3$, $AlPO_4$, $Zr(OH)_4$, $Ti(OH)_4$, $Mg(OH)_2$, $Zn(OH)_2$, $ZnCO_3$, or $Zr(CO_3)_2$. In some embodiments, the cathode active material includes $A_{1+x}Co_\alpha Mn_\beta Ni_\gamma M_\delta O_2$, $A_{1+x}Mn_{2-\alpha}M_\alpha O_4$, $A_{1+x}M'_{1-\alpha}M''_\alpha PO_4$, and $xAMeO_2 \cdot (1-x')A_2Me'O_3$, wherein A is Li or Na, M is one or more of Al, Mg, Ti, B, Ga, Si, Ni, Mn, Co, Zn, or Zr; $0 \leq x \leq 0.4$; or $0 \leq \alpha \leq 1$; M' is one or more of Fe, Mn, Ni, Co, V, or Ti; M" is one or more of Al, Mg, B, Ga, Si, Zn, Zr, or Cu; $0 \leq x \leq 0.4$; $0 \leq \alpha \leq 1$; $0 < x' < 1$; and Me is one or more ion with an average trivalent oxidation state, and Me' is one or more ion with an average tetravalent oxidation state.

In any of the above embodiments, the coating material includes a metal oxide, a metal fluoride, a metal phosphate, or a metal oxyfluoride. For example, the coating material may include a composition of formula $A'_xD_y$, wherein A' is Li, Na, Al, Mg, Fe, Cu, Zn, Cr, Mn, Ni, Ag, Ca, Na, K, In, Ga, Ge, V, Mo, Nb, Si, Ti, Zr, or a mixture of any two or more thereof, and D is $O^{2-}$, $F^-$, $(P_2O_7)^{4-}$, $(PO_4)^{3-}$, or a mixture of any two or more thereof, x is 1, 2, 3, or 4, and y is 1, 2, 3, or 4. In some embodiments, the coating material includes $Al_2O_3$, $ZrO_2$, $MgO$, $ZnO$, $NiO$, $MnO_2$, $TiO_2$, $MgF_2$, $CaF_2$, $AlF_3$, $AlPO_4$, $CoPO_4$, $Li_2MnO_3$, $LiAlO_2$, $LiV_3O_8$, or $Li_5FeO_4$. In some embodiments, the coating material may be $Al_2O_3$.

In any of the above embodiments, which includes lithiating, a lithium source material comprises lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, or lithium phosphate. Where the process includes sodiating, a sodium source material comprises sodium carbonate, sodium hydroxide, sodium nitrate, sodium acetate, sodium oxalate, sodium benzoate, sodium fluoride, sodium chloride, sodium bromide, sodium iodide, sodium oxide, sodium peroxide, sodium sulfate, sodium alloys, sodium silicate, sodium aluminate, or sodium phosphate.

In any of the above embodiments, the cathode active material may include $LiCoO_2$ (LCO), $LiFePO_4$, $LiMeO_2O_4$ (LMO), $LiMeO_2$, or $Li_{1+x''}Ni_\alpha Mn_\beta Co_\gamma M_{\delta'}O_2$, wherein Me may be Ni, Mn, or Co; M may be Mg, Zn, Al, Ga, B, Zr, or Ti; $1 \leq z \leq 6$; $0 \leq x'' \leq 0.4$; $0 \leq \alpha \leq 1$; $0 \leq \beta \leq 1$; $0 \leq \delta' \leq 1$; and $0 \leq \gamma \leq 1$; with the proviso that at least one of $\alpha$, $\beta$ and $\gamma$ may be greater than 0. In any of the above embodiments, the cathode active material may include $LiCoO_2$, $LiNi_{1/3}Mn_{1/3}Co_{1/3}O_2$, $LiNi_{0.8}Co_{0.15}Al_{0.05}O_2$, $LiMn_2O_4$, $LiNi_{0.5}Mn_{1.5}O_4$, $Li_{1.2}Ni_{0.15}Co_{0.10}Mn_{0.55}O_2$, $0.49Li_2MnO_3 \cdot 0.51LiNi_{0.37}Co_{0.24}Mn_{0.39}O_2$, gradient, or $LiFePO_4$.

Accordingly, the method may be used to coat an electrochemically inert material shell on another electrochemical active material that is the core. As further illustrated below, this allows for preparation of a cathode active particle having a cathode active material core that may be of a constant concentration or a gradient concentration, with an electrochemically inert material shell having either a constant concentration or a gradient concentration. In other words there are four combinations possible with the method set forth as core concentration:shell concentration. The four are: constant:constant, gradient: constant; constant:gradient, or gradient: gradient.

In any of the above embodiments, the electrochemically inert material may include a metal oxide, a metal fluoride, a metal phosphate or a mixture of any two or more thereof in any of the above embodiments, the electrochemically inert material may include a composition of formula $A_xB_y$, wherein A may be Li, Al, Mg, Fe, Cu, Zn, Cr, Mn, Ni, Ag, Ca, Na, K, In, Ga, Ge, V, Mo, Nb, Si, Ti, Zr, or a mixture of any two or more thereof, and B may be $O^{2-}$, $F^-$, $(P_2O_7)^{4-}$, $(PO_4)^{3-}$, or a mixture of any two or more thereof, x may be 1, 2, 3, or 4 and y may be 1, 2, 3, or 4.

In any of the above embodiments, the electrochemically inert material may include $Al_2O_3$. In any of the above embodiments, the lithium source material may include lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium, aluminate, or lithium phosphate.

In any of the above embodiments, the preparing the cathode material precursor may include providing an acidic solution of a metal ion and a basic solution; combining the basic solution and the acidic solution to effect co-precipitation of the cathode active material precursor as a particle. In any of the above embodiments, the basic solution may be an aqueous solution or an organic solvent solution. In any of the above embodiments, the basic solution may be an aqueous solution of LiOH, NaOH, KOH, or $NH_4OH$. In any of the above embodiments, the basic solution may include an aqueous solution of a precipitating agent. In any of the above embodiments, the precipitating agent may include ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, or sodium hydrogen oxalate. In any of the above embodiments, the precipitating agent may include sodium carbonate, sodium hydrogen carbonate, ammonium carbonate, or ammonium hydrogen carbonate.

In any of the above embodiments, the acidic solution may be an aqueous solution of a metal sulfate, metal carbonate, metal phosphate, or a mixture of any two or more thereof. In any of the above embodiments, the metal ion may be Ni, Co, or Mn, or a mixture of any two or more thereof. In any of the above embodiments, the coated cathode material precursor may be a particulate material having a generally spherical morphology.

In any of the above embodiments, the coating the cathode material precursor with an electrochemically inert coating material may include: providing an acidic solution of a first electrochemically inert material precursor and a basic solution; and combining the basic solution and the acidic solution to effect precipitation of a second electrochemically inert material precursor; wherein second electrochemically inert material precursor precipitates as a layer coating on individual particles of the cathode material precursor to form the coated cathode material precursor.

In any of the above embodiments, a concentration of the metal ion may be maintained at a substantially constant value during formation of the cathode active material precursor particle, such that the cathode active material precursor particle contains a substantially uniform metal concentration of the metal along a radius of the particle. In any of the above embodiments, a concentration of the metal ion may be increased or reduced during formation of the cathode active material precursor particle, such that the cathode active material precursor contains an increasing or decreasing metal concentration along a radius of the particle. In any of the above embodiments, a concentration of the first electrochemically inert material precursor in the acidic solution may be maintained at a substantially constant value such that the layer of the second electrochemically inert material precursor has a substantially uniform composition along a radius of the layer. In any of the above embodiments, a concentration of the first electrochemically inert material precursor in the acidic solution increased or reduced during precipitation of the second electrochemically inert material precursor such that the layer of the second electrochemically inert material precursor has an increasing or decreasing concentration along a radius of the layer. In any of the above embodiments, a thickness of the layer of the electrochemically inert material on the cathode active material may be from about 1 nm to about 2 μm. This may include from about 1 nm to about 500 nm.

In one aspect, a process of forming a coated cathode active material is provided, the process may include: preparing a cathode material precursor by co-precipitation; coating the cathode material precursor with an electrochemically inert coating material precursor by precipitation to form a coated cathode material precursor; lithiating the coated cathode material precursor with a lithium source material to form a lithiated coated cathode material precursor; and sintering the lithiated coated cathode material precursor to form a cathode active material coated with an electrochemically inert material. In any of the above embodiments, the cathode active material may include $LiCoO_2$(LCO), $LiFePO_4$, $LiMn_2O_4$ (LMO), $LiMeO_2$, or $Li_{1-x}Ni_\alpha Mn_\beta Co_\gamma M_{\delta'}O_2$, wherein Me may be Ni, Mn, or Co;

M may be Mg, Zn, Al, Ga, B, Zr, or Ti; $1 \leq z \leq 6$; $0 \leq x' \leq 0.4$; $0 \leq \alpha \leq 1$; $0 \leq \beta \leq 1$; $0 \leq \delta' \leq 1$; and $0 \leq \gamma 1$; with the proviso that at least one of $\alpha$, $\beta$ and $\gamma$ may be greater than 0. In any of the above embodiments, the cathode active material may include $LiCoO_2$, $LiNi_{1/3}Mn_{1/3}Co_{1/3}O_2$, $LiNi_{0.8}Co_{0.15}Al_{0.05}O_2$, $LiMn_2O_4$, $LiNi_{0.5}Mn_{1.5}O_4$, $Li_{1.2}Ni_{0.15}Co_{0.10}Mn_{0.55}O_2$, $0.49Li_2MnO_3 \cdot 0.51LiNi_{0.37}Co_{0.24}Mn_{0.39}O_2$, gradient, or $LiFePO_4$.

Accordingly, the method may be used to coat an electrochemically inert material shell on another electrochemical active material that is the core. As further illustrated below, this allows for preparation of a cathode active particle having a cathode active material core that may be of a constant concentration or a gradient concentration, with an electrochemically inert material shell having either a constant concentration or a gradient concentration. In other words there are four combinations possible with the method set forth as core concentration:shell concentration. The four are: constant:constant, gradient: constant; constant:gradient, or gradient: gradient.

In any of the above embodiments, the electrochemically inert material may include a metal oxide, a metal fluoride, a metal phosphate or a mixture of any two or more thereof. In any of the above embodiments, the electrochemically inert material may include a composition of formula $A_xB_y$, wherein A may be Li, Al, Mg, Fe, Cu, Zn, Cr, Mn, Ni, Ag, Ca, Na, K, In, Ga, Ge, V, Mo, Nb, Si, Ti, Zr, or a mixture of any two or more thereof, and B may be $O^{2-}$, $F^-$, $(P_2O_7)^{-4}$, $(PO_4)^{3-}$, or a mixture of any two or more thereof, x may be 1, 2, 3, or 4 and y may be 1, 2, 3, or 4.

In any of the above embodiments, the electrochemically inert material may include $Al_2O_3$. In any of the above embodiments, the lithium source material may include lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, or lithium phosphate.

In any of the above embodiments, the preparing the cathode material precursor may include providing an acidic solution of a metal ion and a basic solution; combining the basic solution and the acidic solution to effect co-precipitation of the cathode active material precursor as a particle. In any of the above embodiments, the basic solution may be an aqueous solution or an organic solvent solution. In any of the above embodiments, the basic solution may be an aqueous solution of NaOH, KOH, $NH_4OH$, $Na_2CO_3$, $NH_4HCO_3$, or $Na_2C_2O_4$. In any of the above embodiments, the basic solution may include an aqueous solution of a precipitating agent. In any of the above embodiments, the precipitating agent may include ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, or sodium hydrogen oxalate. In any of the above embodiments, the precipitating agent may include sodium carbonate, sodium hydrogen carbonate, ammonium carbonate, or ammonium hydrogen carbonate.

In any of the above embodiments, the acidic solution may be an aqueous solution of a metal sulfate, metal carbonate, metal phosphate, metal oxalate, metal nitrate, metal chloride, or a mixture of any two or more thereof. In any of the above embodiments, the metal ion may be Ni, Co, Mn, Mg, Al, Ti, B, Ga, Si, Zn, Zr, V, or a mixture of any two or more thereof. In any of the above embodiments, the coated cathode material precursor may be a particulate material having a generally spherical morphology.

In any of the above embodiments, the coating the cathode material precursor with an electrochemically inert coating material may include: providing an acidic solution of a first electrochemically inert material precursor and a basic solution; and combining the basic solution and the acidic solution to effect precipitation of a second electrochemically inert material precursor; wherein second electrochemically inert material precursor precipitates as a layer coating on individual particles of the cathode material precursor to form the coated cathode material precursor.

In any of the above embodiments, a concentration of the metal ion may be maintained at a substantially constant value during formation of the cathode active material precursor particle, such that the cathode active material precursor particle contains a substantially uniform metal concentration of the metal along a radius of the particle. In any of the above embodiments, a concentration of the metal ion may be increased or reduced during formation of the cathode active material precursor particle, such that the cathode active material precursor contains an increasing or decreasing metal concentration along a radius of the particle. In any of the above embodiments, a concentration of the first electrochemically inert material precursor in the acidic solution may be maintained at a substantially constant value such that the layer of the second electrochemically inert material precursor has a substantially uniform composition along a radius of the layer. In any of the above embodiments, a concentration of the first electrochemically inert material precursor in the acidic solution increased or reduced during precipitation of the second electrochemically inert material precursor such that the layer of the second electrochemically inert material precursor has an increasing or decreasing concentration along a radius of the layer. In any of the above embodiments, a thickness of the layer of the electrochemically inert material on the cathode active material may be from about 1 nm to about 500 nm.

In one aspect, a process of forming a coated cathode active material is provided, the process may include: preparing a cathode material precursor by co-precipitation; coating the cathode material precursor with an electrochemically active coating material precursor by precipitation to form a coated cathode material precursor; lithiating the coated cathode material precursor with a lithium source material to form a lithiated coated cathode material precursor; and sintering the lithiated coated cathode material precursor to form a cathode active material coated with an electrochemically active material. In any of the above embodiments, the cathode active material may include $LiCoO_2$ (LCO), $LiFePO_4$, $LiMn_2O_4$ (LMO), $LiMeO_2$, or $Li_{1-x''}Ni_\alpha Mn_\beta Co_\gamma M_\delta O_2$, wherein Me may be Ni, Mn, or Co; M may be Mg, Zn, Al, Ga, B, Zr, or Ti; $0 \leq x'' \leq 0.4$; $0 \leq \alpha \leq 1$; $0 \leq \beta \leq 1$; $0 \leq \delta' \leq 1$; and $0 \leq \gamma \leq 1$; with the proviso that at least one of $\alpha$, $\beta$ and $\gamma$ may be greater than 0. In any of the above embodiments, the cathode active material may include $LiCoO_2$, $LiNi_{1/3}Mn_{1/3}Co_{1/3}O_2$, $LiNi_{0.8}Co_{0.15}Al_{0.05}O_2$, $LiMn_2O_4$, $LiNi_{0.5}Mn_{1.5}O_4$, $Li_{1.2}Ni_{0.15}Co_{0.10}Mn_{0.55}O_2$, $0.49Li_2MnO_3 \cdot 0.51LiNi_{0.37}Co_{0.24}Mn_{0.39}O_2$, gradient, or $LiFePO_4$.

In any of the above embodiments, the electrochemically active material may be the same as or different from the material used as the cathode active material. Accordingly, the method may be used to coat an electrochemically active material shell on another electrochemical active material that is the core. As further illustrated below, this allows for preparation of a cathode active particle having a cathode active material core that may be of a constant concentration or a gradient concentration, with an electrochemically active material shell having either a constant concentration or a gradient concentration. In other words there are four combinations possible with the method set forth as core concentration:shell concentration. The four are: constant:constant, gradient: constant; constant:gradient, or gradient: gradient.

In any of the above embodiments, the lithium source material may include lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, or lithium phosphate.

In any of the above embodiments, the preparing the cathode material precursor may include providing an acidic solution of a metal ion and a basic solution; combining the basic solution and the acidic solution to effect co-precipitation of the cathode active material precursor as a particle. In any of the above embodiments, the basic solution may be an aqueous solution or an organic solvent solution. In any of the above embodiments, the basic solution may be an aqueous solution of NaOH, KOH, $NH_4OH$, $Na_2CO_3$, $NH_4HCO_3$, or $Na_2C_2O_4$. In any of the above embodiments, the basic solution may include an aqueous solution of a precipitating agent. In any of the above embodiments, the precipitating agent may include ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, or sodium hydrogen oxalate. In any of the above embodiments, the precipitating agent may include sodium carbonate, sodium hydrogen carbonate, ammonium carbonate, or ammonium hydrogen carbonate.

In any of the above embodiments, the acidic solution may be an aqueous solution of a metal sulfate, metal carbonate, metal phosphate, metal oxalate, metal nitrate, metal chloride, or a mixture of any two or more thereof. In any of the above embodiments, the metal ion may be Ni, Co, Mn, Mg, Al, Ti, B, Ga, Si, Zn, Zr, V, or a mixture of any two or more thereof. In any of the above embodiments, the coated cathode material precursor may be a particulate material having a generally spherical morphology.

In any of the above embodiments, the coating the cathode material precursor with an electrochemically active coating material may include: providing an acidic solution of a first electrochemically active material precursor and a basic solution; and combining the basic solution and the acidic solution to effect precipitation of a second electrochemically active material precursor; wherein the second electrochemically active material precursor precipitates as a layer coating on individual particles of the cathode material precursor to form the coated cathode material precursor.

In any of the above embodiments, a concentration of the metal ion may be maintained at a substantially constant value during formation of the cathode active material precursor particle, such that the cathode active material precursor particle contains a substantially uniform metal concentration of the metal along a radius of the particle. In any of the above embodiments, a concentration of the metal ion may be increased or reduced during formation of the cathode active material precursor particle, such that the cathode active material precursor contains an increasing or decreasing metal concentration along a radius of the particle. In any of the above embodiments, a concentration of the first electrochemically active material precursor in the acidic solution may be maintained at a substantially constant value such that the layer of the second electrochemically active material precursor has a substantially uniform composition along a radius of the layer. In any of the above embodiments, a concentration of the first electrochemically active material precursor in the acidic solution increased or reduced during precipitation of the second electrochemically active material precursor such that the layer of the second electrochemically active material precursor has an increasing or decreasing concentration along a radius of the layer. In any of the above embodiments, a thickness of the layer of the electrochemically active material on the cathode active material may be from about 1 nm to about 500 nm.

In another aspect, the coated cathode active material produced by any of the above processes is provided.

In another aspect, a cathode may include the coated cathode active material and a binder is provided. In some embodiments, the cathode may further include a current collector.

In another aspect, an electrochemical device is provided may include an anode and the above cathode.

In one aspect, a process of forming a coated cathode active material is provided, the process may include: preparing a cathode material precursor by co-precipitation; coating the cathode material precursor with an electrochemically active coating material precursor by precipitation to form a coated cathode material precursor; lithiating the coated cathode material precursor with a lithium source material to form a lithiated coated cathode material precursor; and sintering the lithiated coated cathode material precursor to form a cathode active material coated with an electrochemically active material In any of the above embodiments, the cathode active material may include $LiCoO_2$ (LCO), $LiFePO_4$, $LiMn_2O_4$ (LMO), $LiMeO_2$, or $Li_{1+x}Ni_\alpha Mn_\beta Co_\gamma M_\delta O_2$, wherein Me may be Al, Mg, Ti, B, Ga, Si, Ni, Mn, or Co; M may be Mg, Zn, Al, Ga, B, Zr, or Ti; $0 \le x'' \le 0.4$; $0 \le \alpha \le 1$; $0 \le \beta 1$; $0 \le \delta' \le 1$; and $0 \le \gamma \le 1$; with the proviso that at least one of $\alpha$, $\beta$ and $\gamma$ may be greater than 0. In any of the above embodiments, the cathode active material may include $LiCoO_2$, $LiNi_{1/3}Mn_{1/3}Co_{1/3}O_2$, $LiNi_{0.8}Co_{0.15}Al_{0.05}O_2$, $LiMn_2O_4$, $LiNi_{0.5}Mn_{1.5}O_4$, $Li_{1.2}M_{0.15}Co_{0.10}Mn_{0.55}O_2$, $0.49Li_2MnO_3 \cdot 0.51LiNi_{0.37}Co_{0.24}Mn_{0.39}O_2$, gradient, or $LiFePO_4$.

In any of the above embodiments, the electrochemically active material may be the same as or different from the material used as the cathode active material. Accordingly, the method may be used to coat an electrochemically active material shell on another electrochemical active material that is the core. As further illustrated below, this allows for preparation of a cathode active particle having a cathode active material core that may be of a constant concentration or a gradient concentration, with an electrochemically active material shell having either a constant concentration or a gradient concentration. In other words there are four combinations possible with the method set forth as core concentration:shell concentration. The four are: constant:constant, gradient: constant; constant:gradient, or gradient: gradient.

In any of the above embodiments, the lithium source material may include lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, or lithium phosphate.

In any of the above embodiments, the preparing the cathode material precursor may include providing an acidic solution of a metal ion and a basic solution; combining the basic solution and the acidic solution to effect co-precipitation of the cathode active material precursor as a particle. In any of the above embodiments, the basic solution may be an aqueous solution or an organic solvent solution. In any of the above embodiments, the basic solution may be an aqueous solution of NaOH, KOH, NH$_4$OH, Na$_2$CO, NH$_1$HCO$_3$, or Na$_2$C$_2$O$_4$. In any of the above embodiments, the basic solution may include an aqueous solution of a precipitating agent. In any of the above embodiments, the precipitating agent may include ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, or sodium hydrogen oxalate. In any of the above embodiments, the precipitating agent may include sodium carbonate, sodium hydrogen carbonate, ammonium carbonate, or ammonium hydrogen carbonate.

In any of the above embodiments, the acidic solution may be an aqueous solution of a metal sulfate, metal carbonate, metal phosphate, metal oxlate, metal nitrate, metal chloride, or a mixture of any two or more thereof. In any of the above embodiments, the metal ion may be Ni, Co, Mn, Mg, Al, Ti, B, Ga, Si, Zn, Zr, V, or a mixture of any two or more thereof in any of the above embodiments, the coated cathode material precursor may be a particulate material having a generally spherical morphology.

In any of the above embodiments, the coating the cathode material precursor with an electrochemically active coating material may include: providing an acidic solution of a first electrochemically active material precursor and a basic solution; and combining the basic solution and the acidic solution to effect precipitation of a second electrochemically active material precursor; wherein the second electrochemically active material precursor precipitates as a layer coating on individual particles of the cathode material precursor to form the coated cathode material precursor.

In any of the above embodiments, a concentration of the metal ion may be maintained at a substantially constant value during formation of the cathode active material precursor particle, such that the cathode active material precursor particle contains a substantially uniform metal concentration of the metal along a radius of the particle. In any of the above embodiments, a concentration of the metal ion may be increased or reduced during formation of the cathode active material precursor particle, such that the cathode active material precursor contains an increasing or decreasing metal concentration along a radius of the particle. In any of the above embodiments, a concentration of the first electrochemically active material precursor in the acidic solution may be maintained at a substantially constant value such that the layer of the second electrochemically active material precursor has a substantially uniform composition along a radius of the layer. In any of the above embodiments, a concentration of the first electrochemically active material precursor in the acidic solution increased or reduced during precipitation of the second electrochemically active material precursor such that the layer of the second electrochemically active material precursor has an increasing or decreasing concentration along a radius of the layer. In any of the above embodiments, a thickness of the layer of the electrochemically active material on the cathode active material may be from about 1 nm to about 500 nm.

In another aspect, the coated cathode active material produced by any of the above processes is provided.

In another aspect, a cathode may include the coated cathode active material and a binder is provided. In some embodiments, the cathode may further include a current collector.

In another aspect, an electrochemical device is provided may include an anode and the above cathode.

DETAILED DESCRIPTION

Figure 1:
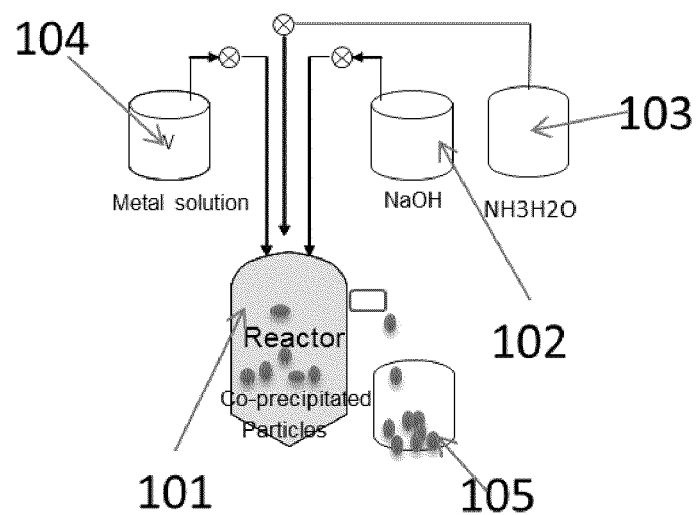
FIG. 1 is a schematic of a system for a co-precipitation process by a continuous stirred tank reactor (CSTR), according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Following, described is a coating technology for cathode active materials with an electrochemically inert or active coating (i.e. layer) that is significantly different from previous coating technologies. In the present technology, cathode active materials are coated in-situ at the precursor level during the co-precipitation process of the cathode active material with an electrochemically inert or active coating precursor. After formation of coated cathode active material precursor particles, the final active material may be obtained by treating the coated precursors with suitable lithium-containing compounds using the solid-state sintering. This coating technology ensures the formation of a coating layer that may entirely cover the active particles, and allows for precise control of the composition of the coating layer as either a constant or gradient material. The coated cathode active materials prepared from this technology show significantly improved electrochemical performance over the traditionally coated materials.

In one aspect, a coated cathode active material precursor is provided that includes a plurality of coated metal hydroxide particles. The coating on the metal hydroxide particles may average in thickness from about 1 nm to 500 nm. The plurality of metal hydroxide particles of the cathode active material precursor are generally spherical and may have an average diameter of about 1 µm to about 100 µm. The surface-coated cathode active material is prepared from the thermal reaction (i.e. sintering) of the coated metal hydroxide precursor with a lithium-containing precursor, such as, but not limited to LiOH, $Li_2CO_3$, $LiNO_3$, and $CH_3COOLi$. The cathode active material has a coated structure, the thickness of the coating layer is from about 1 nm to about 500 nm, and the average of the particle size of the surface coated cathode active material is about µm to 100 µm. In some embodiments, the thickness of the coating layer is about 1 nm to 10 nm, and the average particle size of the surface coated cathode active material is 1 µm to 15 µm.

In one aspect, the compositions of the cathode active material are any commonly used cathode active materials for lithium ion batteries. The cathode active materials may generally be $LiCoO_2$ (LCO), $LiFePO_4$, $LiMn_2O_4$ (LMO), $LiMeO_2$, or $Li_{1+x''}Ni_\alpha Mn_\beta Co_\gamma M_{\delta'}O_2$, wherein Me may be Ni, Mn, or Co; M may be Mg, Zn, Al, Ga, B, Zr, or Ti; $1 \leq z \leq 6$; $0 \leq x'' \leq 0.4$; $0 \leq \alpha \leq 1$; $0 \leq \beta \leq 1$; $0 \leq \delta' \leq 1$; and $0 \leq \gamma \leq 1$; and $0 \leq \gamma \leq 1$; with the proviso that at least one of α, β and γ is greater than 0. In some embodiment, illustrative cathode active materials include, but are not limited to, $LiCoO_2$ (LCO), $LiFePO_4$, $LiMn_2O_4$ (LMO), $LiNi_{1/3}Mn_{1/3}Co_{1/3}O_2$ (NMC), $LiNi_{0.8}Co_{0.15}Al_{0.05}O_2$ (NCA), $LiNi_{0.5}Mn_{1.5}O_4$ (LNMO), $Li_{1.2}Ni_{0.15}Co_{0.10}Mn_{0.55}O_2$ ($0.49Li_2MnO_3 \cdot 0.51LiNi_{0.37}Co_{0.24}Mn_{0.39}O_2$), or $LiFePO_4$.

The compositions, $A_xB_y$, of the coating layer may be one or more of a metal oxide, a metal fluoride, or a metal phosphate. In the formula, A may be Li, Al, Mg, Fe, Cu, Zn, Cr, Mn, Ni, Ag, Ca, Na, K, In, Ga, Ge, V, Mo, Nb, Si, Ti, Zr, or a mixture of any two or more thereof. In the formula, B may be selected from $O^{-2}$, $F^-$, $Cl^-$, $Br^-$, $S^{2-}$, $N^{3-}$, $^-OH$, $HC(O)O^-$, $CO_3^{2+}$, $C_2O_4^{2-}$, $P_2O_7^{2-}$, $PO_4^{4-}$, $SO_4^{2-}$, or a mixture of any two or more thereof. In the formula x and y balance the chemical valance of A and B.

The coating layer on the surface of the cathode active particles may be adjusted to have the same or different chemical compositions. In some embodiments, the composition of the coating layer ($A_xB_y$) is constant through the layer. In some embodiments, the composition of the coating layer ($A_xB_y$) may be changed. In some embodiments, the composition of the coating layer ($A_xB_y$) can have gradient.

In other aspect, the precursor of the cathode active material (lithium metal oxide as described above), may be metal hydroxide, metal oxyhydroxide, metal carbonate, metal oxalate and metal phosphate.

In some embodiments, the precursor of the coating layer may be electrochemically inert, or it may have a chemical composition similar to or the same as the cathode active material precursor. In some embodiments, the composition of the coating layer (AxBy) is constant through the precursor layer. In some embodiments, the composition of the coating layer (AxBy) may be changed in the precursor layer. In some embodiments, the composition of the coating layer (AxBy) can have gradient through the precursor layer.

In some embodiments, the surface-coated cathode active material is prepared from the coated precursors with lithium source material. The lithium source material may be a material such as, but not limited to, lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, lithium phosphate, or a mixture of any two or more thereof.

In other aspect, a process for preparing a coated cathode active material is provided. The process may include three steps: step 1 is to prepare the precursor of cathode active material using co-precipitation method; step 2 is to prepare the precursor of the coating layer on the precursor of cathode material using a precipitation method; and step 3 is to calcine the precursor with a lithium source material to obtain the surface-coated cathode material. The process of step 1 is to prepare the precursor of cathode active material using co-precipitation method. It includes preparing an acidic solution; preparing a basic solution; and precipitating an cathode active material precursor from the reaction of the acidic and basic solutions with an ammonia solution as chelate using a continuous stirred tank reactor (CSTR). In some embodiments, a morphology of the precursor is spherical with the particle size from about 1 µm to about 15 µm. The composition of the precursor(s) for the cathode active material may be a metal hydroxide, metal oxyhydroxide, metal carbonate, metal oxalate, or metal phosphate. In some embodiments, the step of preparing the acid solution includes dissolving a metal precursor salt, $M_xX_y$, in distilled water or an organic solvent; wherein M may be selected from Ni, Co, Mn, Al, Mg, Fe, Cu, Zn, V, Mo, Nb, Cr, Si, Ti, Zr, or a mixture of any two or more thereof; X is selected from $NO_3^-$, $CO_4^{2-}$, $CO_3^{2-}$, $PO_4^{3-}$, $F^-$, $Cl^-$, $Br^-$, $I^-$, or a mixture of any two more thereof, and x and y are 1, 2, 3, or 4, and are based upon the valence values of the respective M and X ions. In some such embodiments, M is nickel, cobalt, manganese, or a mixture of any two or more thereof, and X is $SO_4^{2-}$.

In some embodiments, the step of preparing the basic solution includes dissolving a precipitating agent in distilled water or an organic solvent with a chelate solution, wherein the precipitating agent is selected from ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, sodium hydrogen oxalate, or a mixture of any two or more thereof. In some such embodiments, the precipitating agent is selected from sodium carbonate, sodium hydrogen carbonate, ammonium carbonate, ammonium hydrogen carbonate, or a mixture of any two or more thereof. In some embodiments, the precipitating or chelating agent is ammonia.

The concentration, temperature, and pH of the acidic and basic solutions for preparing the precursor of cathode active material may vary. In some embodiments, a concentration of the acidic solution is from about 0.01M to 5M (where M is molar, mol/L). In other embodiments, it is from about 1M to about 3M. In some embodiments, a temperature of the acidic solution is from about 25° C. to about 100° C. In other embodiments, the temperature is from about 25° C. to about 60° C. In other embodiments, a temperature of the basic solution is from about 25° C. to about 100° C., or from about 25° C. to about 60° C. In some embodiments, a pH during the reaction of the acidic and basic solution is from about 5 to about 12. In other embodiments, a pH during the reaction of the acidic and basic solution is from about 7 to about 9. Similarly, the concentration of the precipitating or chelating agent may vary. In some embodiments, a concentration of the precipitating or chelating agent is from about 0.01M to about 10M, or from about 1M to about 3M. The stirring speed of the reaction of the acidic and basic solutions may also vary. In some embodiments, a stirring speed of the reaction of the acidic and basic solution is from about 50 to about 5000 rpm, or from about 100 rpm to about 1000 rpm, in other embodiments. The particles size of the precursor may vary. In some embodiments, the particles size of the precursor is from about 1 μm to about 100 μm, or from about 5 μm to about 20 μm. Finally, the packing density of the precursor may vary. In some embodiments, the packing density of the precursor is from about 0.5 g/cm³ to about 4.0 g/cm³, or from about 1.0 g/cm³ to about 2.0 g/cm³.

Step 2 of the process is to prepare the precursor of the coating layer on the precursor of cathode material using a precipitation method. It includes preparing an acidic solution; preparing a basic solution; and precipitating a precursor of the coating layer on the surface of the precursor of cathode material from the combination of the acidic and basic solutions with an ammonia solution as chelating (i.e. precipitation) agent through a CSTR. In some embodiment, the thickness of coating layer precursors is from about 1 nm to about 500 nm, or from about 2 nm to about 30 nm. The compositions of the coating layer precursors may include a metal hydroxide, metal oxyhydroxide, metal carbonate, metal oxalate, metal oxide, metal fluoride, metal nitrate, metal chloride, or metal phosphate. As with any listing herein, the materials of the listing may be used either singly or as a mixture of any two or more thereof. The coating layer precursor may be adjusted to have the same or different chemical composition on the surface of particles. In some embodiments, the coating layer precursor is a precursor to an electrochemically inert coating material. In some embodiments, the composition of the coating layer precursor is constant through the layer. In some embodiments, the composition of the coating layer precursor ($A_xB_y$) can vary. In some embodiments, the composition of the coating layer ($A_xB_y$) can have gradient through the precursor layer.

In some embodiments, the step of preparing the acid solution and basic solution for the coating layer is the same as for the preparation of cathode material precursor described above. The acid solution includes dissolving a metal precursor salt, $M_aX_b$, in distilled water or an organic solvent; wherein M may be selected from Li, Al, Mg, Fe, Cu, Zn, Cr, Mn, Ni, Ag, Ca, Na, K, In, Ga, Ge, V, Mo, Nb, Si, Ti, Zr or a mixture of any two or more thereof; X may be selected from $NO_3^-$, $SO_4^{2-}$, $CO_3^{2-}$, $PO_4^{3-}$, $F^-$, $Cl^-$, $Br^-$, $I^-$, or a mixture of any two more thereof; and x and y are 1, 2, 3, or 4 and are based upon the valence values of the respective M and X ions. In some embodiments, M is Al and X is $NO_3^-$. The basic solution includes dissolving a precipitating agent in distilled water or an organic solvent with a chelate agent, wherein the precipitating or chelating agent is selected from ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, sodium hydrogen oxalate, or a mixture of any two or more thereof. In some such embodiments, the precipitating agent and chelating agent are selected from sodium hydroxide and ammonia.

The concentrations, temperatures, and pH of the acidic and basic solutions for preparing the precursor of coating layer may vary. In some embodiments, a concentration of the acidic solution is from about 0.01M to about 5M, or from about 1M to about 3M. In some embodiments, a temperature of the acidic solution is from about 25° C. to about 100° C., or from about 25° C. to about 60° C. In other embodiments, a temperature of the basic solution is from about 25° C. to about 100° C., or from about 25° C. to about 60° C. In some embodiments, a pH during the reaction of the acidic and basic solution is from about 5 to about 12, or from about 7 to about 9. Similarly, the concentration of the precipitating or chelating agent may vary. In some embodiments, a concentration of the precipitating or chelating agent is from about 0.01M to about 10M, or from about 1M to about 3M. The stirring speed of the reaction of the acidic and basic solutions may also vary. In some embodiments, a stirring speed of the reaction of the acidic and basic solution is from about 50 rpm to about 5000 rpm, or from about 100 rpm to about 1000 rpm. Finally, the thickness of coating layer precursor is from about 1 nm to about 500 nm, or from about 2 nm to about 30 nm.

In process, step 3 is to calcine the coated precursor with a lithium source material to obtain the coated cathode active material. In some embodiments, the process further includes pre-calcining the coated precursor at about 100° C. to about 1000° C., or from about 300° C. to about 600° C., mixing with a lithium source material, and calcining at about 100° C. to about 1300° C., or from about 700° C. to about 900° C. to obtain the surface-coated cathode active material. In some embodiments, the process includes calcining the mixed coated precursor with lithium source material at about 100° C. to about 1300° C., or from about 700° C. to about 900° C. to obtain the surface-coated cathode active material.

The lithium source material may include a material such as, but not limited to, lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, or lithium phosphate. Mixtures of any two or more thereof may also be used. The step of introducing the lithium source is conducted in a dry or a wet mixer.

In another aspect, electrochemical devices are provided. In some embodiments, the electrochemical device includes a positive electrode including any of the above materials; a negative electrode; and a non-aqueous electrolyte. In some embodiments, the electrochemical device is a lithium secondary battery having the positive electrode and the negative electrode separated from each other by a porous separator.

In any of the above embodiments, the non-aqueous electrolyte includes an alkali metal salt and a polar aprotic solvent. The alkali metal salt may be a lithium salt including, but not limited to, $Li[B(C_2O_4)_2]$, $Li(C_2O_4)BF_2$, $Li[PF_2(C_2O_4)_2]$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof. The polar aprotic solvent may be selected from ethylene carbonate, propylene carbonate, dimethyl carbonate, diethyl carbonate, ethyl methyl carbonate, dimethyl ether, gamma-butyrolactone, or a mixture of any two or more thereof.

Referring to the figures, a precipitation process is provided for preparing a coated precursor particle for cathode active materials for a lithium ion battery using a continuous stirred-tank reactor (CSTR) 101. See FIG. 1. The coated precursor particle is formed by a precipitation process from a CSTR 101 with a basic solution 102 including a precipitating agent dissolved in distilled water or an organic solvent and a chelate solution 103, and an acidic solution 104. The precipitating agent may be ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, sodium hydrogen oxalate, or a mixture of any two or more thereof. In some embodiments, the chelating agent is ammonia.

Figure 2:
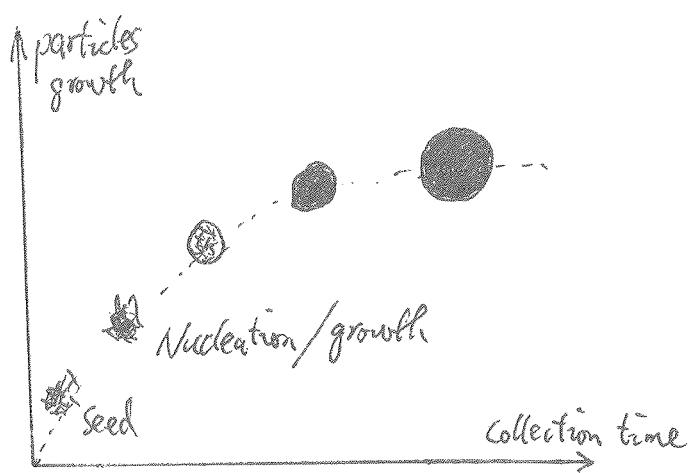
FIG. 2 is a graph of the particle nucleation, growth, and maturation of a co-precipitation.
Figure 3A:
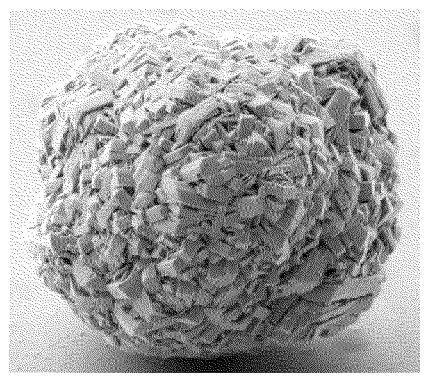
FIGS. 3A and 3B illustrate a typical precursor particle and cross-section SEM images from a CSTR, respectively, according to the examples.
Figure 3B:
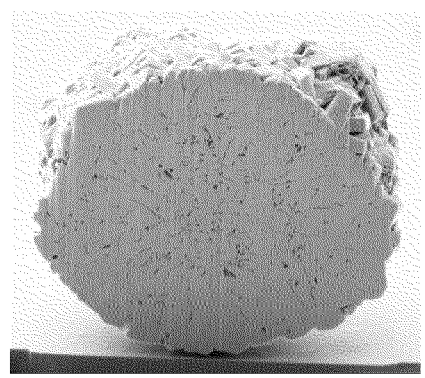

An acid solution 104 includes a metal precursor salt, $M_xX_y$, dissolved in distilled water or an organic solvent. In the formula, M is Ni, Co, Mn, Al, Mg, Fe, Cu, Zn, V, Mo, Nb, Cr, Si, Ti, Zr, or a mixture of any two or more thereof; X is $NO_3^-$, $SO_4^{2-}$, $CO_3^{2-}$, $PO_4^{3-}$, $F^-$, $Cl^-$, $Br^-$, $I^-$, or a mixture of any two more thereof, and x and y are based upon the valence values of M and X. In some embodiments, M is nickel, cobalt, manganese, or a mixture of any two or more thereof, and X is $SO_4^{2-}$. Combining the acidic 104 and basic 102 solutions with a chelate solution 103 using a CSTR 101 precipitates a cathode active material precursor particle 105 from the combined solution. The formation of the cathode active material precursor particle 105 in the reactor 101 includes nucleation, growth, and maturation steps, as illustrated in FIG. 2. Initially, acidic 104 and basic 102 solutions with a chelate solution 103, at a controlled pH value, are added drop-wise to the CSTR 101 with stirring to initiate seed, i.e. nucleation, formation. As solutions 102, 103 and 104 are added to the reactor 101, the seeds grow to form a spherical particle. Finally, the particle matures and drops out from the reactor 101. A mature, dense spherical particle 105 may then be collected. A typical mature cathode active material precursor particle 105 is show in the SEM image of FIG. 3. The particle size shown is about 13 μm. In order to achieve the coating material precursor, additional precipitation is followed using a continuous stirred-tank reactor (CSTR) 101. See FIG. 1. A coating acid solution 104 was combined with a basic solution 102 and a chelate solution 103 using a CSTR 10. The precipitate forms a coating precursor for cathode material precursor particle. The coating layered is about 1 nm to about 500 nm in thickness.

Figure 4:
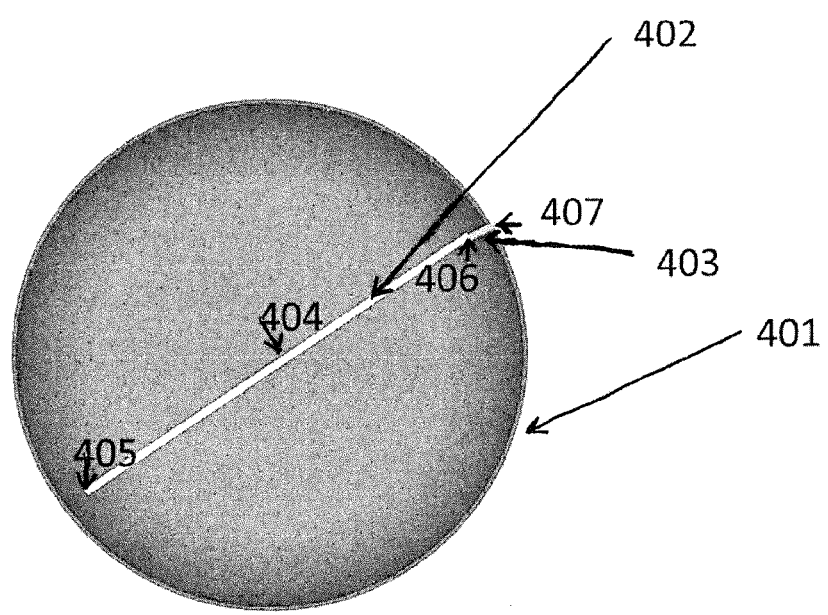
FIG. 4 illustrates a sketch of the coating on the precursor surface, according to the examples.

FIG. 4 is an illustrated of the coated precursor particle for the cathode active materials of lithium ion battery. In FIG. 4, the coated cathode active precursor particle 401 has a core-shell type structure with an active cathode active material precursor 402, and a thin coating layer 403 on the cathode active material precursor 402 surface. A radius of the particle is defined by the center of the particle 404, to the surface of the coated precursor particle 407. Line 405/406 divides the cathode active material precursor 402 from the coating layer 403.

Figure 5:
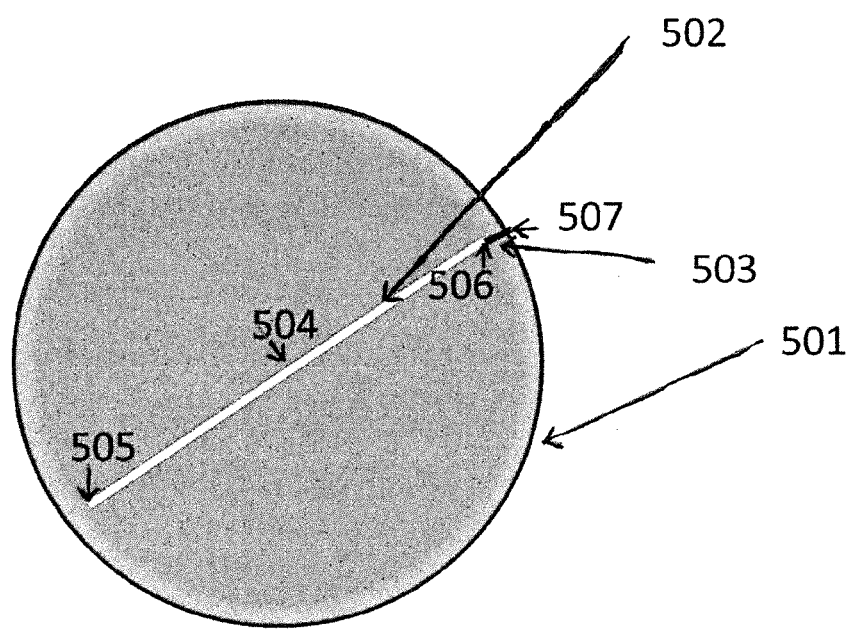
FIG. 5 illustrates a sketch of the coating on the cathode surface, according to the examples.

FIG. 5 is an illustrated of the coated cathode active material particle for a lithium ion battery. In FIG. 5, the coated cathode active material particle 501 has a core-shell type structure with an active coated cathode active material core 502, and a thin coating layer 503 on the cathode active material 502 surface. A radius of the particle is defined by the center of the particle 504, to the surface of the coated particle 507. Line 505/506 divides the cathode active material 502 from the coating layer 503.

Unlike other coating layers on cathode active materials that use a post-particle formation coating process, the present technology prepares a combined cathode active material and coating precursor prior to formation of the final active material. The thickness, structure, morphology, and composition of the cathode active material 502 and the coating layer 503 are formed from the precursor 402 and coating layer precursor 403. Both of the precursor 402 and coating layer 403 come from a co-precipitation process by CSTR.

The cathode active material may be any commonly used cathode material of lithium ion battery. Such materials include, but are not limited to, $LiCoO_2$ (LCO), $LiNi_{1/3}Mn_{1/3}Co_{1/3}O_2$ (NMC), $LiNi_{0.8}Co_{0.15}Al_{0.05}O_2$ (NCA), $LiMn_2O_4$ (LMO), $LiNi_{0.5}Mn_{1.5}O_4$ (LNMO), $Li_{1.2}Ni_{0.15}Co_{0.10}Mn_{0.55}O_2$, $0.49Li_2MnO_3 \cdot 0.51LiNi_{0.37}Co_{0.24}Mn_{0.39}O_2$, gradient NMC material, or $LiFePO_4$. The coating layer for the cathode material, may be a metal oxide, metal fluoride, metal phosphate, or a mixture of any two or more thereof. For example, it may be a composition of formula $A_xB_y$, where A is Li, Al, Mg, Fe, Cu, Zn, Cr, Mn, Ni, Ag, Ca, Na, K, In, Ga, Ge, V, Mo, Nb, Si, Ti, Zr or a mixture of any two or more thereof, B is $O^{2-}$, $F^-$, $(P_2O_7)^{4-}$, $PO_4^{3-}$, or a mixture of any two or more thereof.

The coating layer 503 within cathode particle 501 may be adjusted to have the same or different chemical composition on the surface of particles. In some embodiments, the distribution of the coating layer 503 is constant throughout. In some embodiments, the distribution of the coating layer 503 is varied having an increasing or decreasing gradient when moving from the center of the particle to the outer surface.

The precursor 402 of cathode active material 502, may be a metal hydroxide, metal oxyhydroxide, metal carbonate, metal oxalate, or metal phosphate. The metal could select from Li, Al, Mg, Fe, Cu, Zn, Cr, Mn, Ni, Co, Ag, Ca, Na, K, In, Ga, Ge, V, Mo, Nb, Si, Ti, Zr, or a mixture of any two or more thereof. In some embodiment, the metal is Mn, Ni, and Co.

The coating layer 403 of the cathode active precursor 402 may be metal hydroxide, metal oxyhydroxide, metal carbonate, metal oxalate, metal oxide, metal fluoride, metal nitrate, metal chloride, metal phosphate, or a mixture of any two or more thereof. For example, the material for the coating precursor may be of formula $A_{x'}B_{y'}$, where A is Li, Al, Mg, Fe, Cu, Zn, Cr, Mn, Ni, Co, Ag, Ca, Na, K, In, Ga, Ge, V, Mo, Nb, Si, Ti, Zr, or a mixture of any two or more thereof, B is $O^{2-}$, $F^-$, $Cl^-$, $Br^-$, $I^-$, $S^{2-}$, $N^{3-}$, $^-OH$, $CO_3^{2-}$, $C_2O_4^{2-}$, $(P_2O_7)^{4-}$, $PO_4^{3-}$, $SO_4^{2-}$, or a mixture of any two or more thereof, and where x' and y' balance the chemical valances of A and B.

In some embodiments, the coating layer 403 within precursor particle 401 may be adjusted to have the same or different chemical composition on the surface of particles. In some embodiments, the distribution of the coating layer ($A_{x'}B_{y'}$) is constant through the layer 403 for the cathode material precursor 402. In some embodiments, the distribution of the coating layer ($A_{x'}B_{y'}$) 403 is varied for the cathode material precursor 402. In some embodiments, the coating layer ($A_{x'}B_{y'}$) 403 has a gradient change with the precursor composition for the cathode material precursor 402.

The process for preparing the coated cathode material 501 may include three steps. Step 1 is to prepare a cathode active material precursor 402 using a co-precipitation method. Step 2 is to prepare a coating precursor 401 using a precipitation method. Step 3 is to calcine precursor 401 with a lithium source material to obtain a coated cathode active material 501.

The process of step 1 is to prepare cathode material precursor 402 using co-precipitation. It includes preparing an acidic solution 104, preparing a basic solution 102, and precipitating a cathode material precursor 402 from the combined acidic 104 and basic 102 solutions with an ammonia solution as a chelate solution 103 using a CSTR 101. In some embodiments, the precursor 402 is spherical, and the sizes may be from about 1 μm to about 15 μm. The composition of the precursor 402 may be a metal hydroxide, metal oxyhydroxide, metal carbonate, metal oxalate, or metal phosphate. In some embodiments, the step of preparing the acid solution 104 includes dissolving a metal precursor salt, $M_aX_b$, in distilled water or an organic solvent. In the formula $M_aX_b$, M is Ni, Co, Mn, Al, Mg, Fe, Cu, Zn, V, Mo, Nb, Cr, Si, Ti, Zr, or a mixture of any two or more thereof; X is $NO_3^-$, $SO_4^{2-}$, $CO_3^{2-}$, $PO_4^{3-}$, $F^-$, $Cl^-$, $Br^-$, $I^-$, or a mixture of any two more thereof. In some such embodiments, M is nickel, cobalt, manganese, or a mixture of any two or more thereof, and X is $SO_4^{2-}$.

In some embodiments, the step of preparing the basic solution 102 includes dissolving a precipitating agent in distilled water or an organic solvent and a chelate solution 103. Illustrative precipitating or chelating agents include, but are not limited to, ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, sodium hydrogen oxalate, and mixtures of any two or more thereof. In some embodiments, the precipitating agent or chelating agent is sodium carbonate, sodium hydrogen carbonate, ammonium carbonate, ammonium hydrogen carbonate, or a mixture of any two or more thereof.

The concentrations, temperatures, and pH of the acidic 104 and basic 102 solutions may vary. In some embodiments, a concentration of the acidic solution 104 is from about 0.01 to about 5M, or from about 1M to about 3M. In some embodiments, a temperature of the acidic solution 104 is from about 25° C. to about 100° C., or from about 25° C. to about 60° C. In other embodiments, a temperature of the basic solution 103 is from about 25° C. to about 100° C., or from about 25° C. to about 60° C. In some embodiments, a pH during the reaction of the acidic 104 and basic 102 solution is from about 5 to about 12, or from about 7 to about 9. Similarly, the concentration of the precipitating or chelating agent 103 may vary. In some embodiments, a concentration of the precipitating or chelating agent 103 is about 0.01M to about 10M, or from about 1M to about 3M. The stirring speed of the reaction of the acidic 104 and basic 102 solutions may also vary. In some embodiments, a stirring speed of the reaction of the acidic 104 and basic 102 solution is from about 50 to about 5000 rpm, or from about 100 to 1000 rpm. The particle size of the precursor 402 may vary. In some embodiments, the particles size of the precursor 402 is from about 1 μm to about 100 μm, or from about 5 μm to about 20 μm. The packing density of the precursor 402 may vary. In some embodiments, the packing density of the precursor 402 is from about 0.5 g/cm³ to about 4.0 g/cm³, or from about 1.0 g/cm³ to 2.0 g/cm³.

The process of step 2 is to prepare the coating layer 403 for the cathode material precursor 402 using precipitation. It includes preparing an acidic solution 104; preparing a basic solution 102; and precipitating a coating layered 403 on the precursor 402 surface from the combined acidic 104 and basic 102 solutions with an ammonia solution as chelate 103 solution through a CSTR 101. In some embodiment, the thickness of coating layer 403 on the precursor 402 is from about 1 nm to about 500 nm, or from about 2 nm to about 30 nm. The composition of the coating layer 403 are metal hydroxide, metal oxyhydroxide, metal carbonate and metal oxalate, metal oxide, metal fluoride, metal nitrate, metal chloride, metal phosphate or a mixture of any two or more thereof. For example, $Al(NO_3)_3$ may react with $NH_4F$ to precipitate $AlF_3$ in aqueous solution. In some embodiments, the distribution of the coating layer 403 is constant through the layer. In some embodiments, the distribution of the coating layer 403 is varied. In some embodiments, the coating layer 403 is gradient change with the coated material 402.

In some embodiments, the step of preparing the acid solution 104 and basic solution 102 for the coating layer 403 is the same as for the cathode material precursor 402 preparation described above. The acid solution 104 includes dissolving a metal precursor salt, $M_aX_b$, in distilled water or an organic solvent. In the formula, M is Li, Al, Mg, Fe, Cu, Zn, Cr, Mn, Ni, Ag, Ca, Na, K, In, Ga, Ge, V, Mo, Nb, Si, Ti, Zr, or a mixture of any two or more thereof, X is $NO_3^-$, $SO_4^{2-}$, $CO_3^{2-}$, $PO_4^{3-}$, $F^-$, $Cl^-$, $Br^-$, $I^-$, or a mixture of any two more thereof. In some such embodiments, M is Al and X is $NO_3^-$. The basic solution 102 includes dissolving a precipitating agent in distilled water or an organic solvent and a chelate solution. Illustrative precipitating or chelating agents include, but are not limited to, ammonia, sodium carbonate, sodium hydrogen carbonate, ammonium carbonate, ammonium hydrogen carbonate, sodium hydroxide, potassium hydroxide, lithium hydroxide, ammonium hydroxide, sodium oxalate, sodium hydrogen oxalate, or a mixture of any two or more thereof. In some embodiments, the precipitating agent 102 and chelating agent 103 is selected from sodium hydroxide and ammonia.

The concentrations, temperatures, and pH of the acidic 104 and basic 102 solutions for the coating layered 403 may vary. In some embodiments, a concentration of the acidic 104 solution is about 0.01M to about 5M, or from about 1M to about 3M. In some embodiments, a temperature of the acidic 104 solution is from about 25° C. to about 100° C., or from about 25° C. to about 60° C. In other embodiments, a temperature of the basic 102 solution is from about 25° C. to about 100° C., or from about 25° C. to about 60° C. In some embodiments, a pH during the reaction of the acidic 102 and basic 104 solution is from about 5 to about 12, or from about 7 to about 9. Similarly, the concentration of the precipitating 102 or chelating 103 agent may vary. In some embodiments, a concentration of the precipitating 102 or chelating 103 agent is from about 0.01M to about 10M, or from about 1M to about 3M. The stirring speed of the reaction of the acidic 104 and basic 102 solutions may also vary. In some embodiments, a stirring speed of the reaction of the acidic 104 and basic 102 solution is from about 50 to about 5000 rpm, or from about 100 to about 1000 rpm. Finally, the thickness of coating layer 403 on the precursors is from about 1 nm to about 500 nm, or from about 2 nm to about 30 nm.

The process of step 3 is to calcine the coated precursor 401 with lithium source material to obtain the coated cathode material 501. In some embodiments, the process further includes calcining the coated precursor 401 at 100° C. to about 1000° C., or from about 300° C. to about 600° C., mixing with a lithium source material, and calcining at about 100° C. to about 1300° C., or from about 700° C. to about 900° C. to obtain the surface-coated cathode active material. In some embodiments the process includes calcining the mixed coated precursor with lithium source material at about 100° C. to about 1300° C., or from about 700° C. to about 900° C. to obtain the coated cathode material 501. In some embodiments, the calcination refers to heating a material 401 with lithium source material at a designated temperature in either an inert atmosphere, in air, or under a reducing atmosphere. In some embodiments, the inert atmosphere is helium, argon, nitrogen, or a mixture of any two or more such inert gases. Reducing atmospheres may be provided by hydrogen gas.

The lithium source may include lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, lithium phosphate, or a mixture of any two or more thereof. The step of introducing the lithium source may be conducted in a dry or a wet mixer.

In other embodiments, the lithium diffusion during the process of lithiation of the coated precursors 401 may or may not react with the coating layer 403 of the particles. In all aspects, the lithium diffusion during the process of lithiation of the coated precursors 402 may change the thickness of the coating layer 403 from about 1 nm to about 100 nm to about 2 nm to about 200 nm, without impacting the morphology of the cathode material particles 501.

The cathode active material may be any commonly used cathode material in lithium ion batteries. Illustrative cathode active materials include, but are not limited to, $LiCoO_2$, $LiNi_{1/3}Mn_{1/3}Co_{1/3}O_2$, $LiNi_{0.8}Co_{0.15}Al_{0.05}O_2$, $LiMn_2O_4$, $LiNi_{0.5}Mn_{1.5}O_4$, $Li_{1.2}Ni_{0.15}Co_{0.10}Mn_{0.55}O_2$, $0.49Li_2MnO_3 \cdot 0.51LiNi_{0.37}Co_{0.24}Mn_{0.39}O_2$, a gradient material, or $LiFePO_4$. The electrochemically inert coating layer for the cathode active material may be a metal oxide, metal fluoride, metal phosphate or a mixture of any two or more thereof. Illustrative electrochemically inert coating layer compositions may be of formula $A_xB_y$, where A is Li, Al, Mg, Fe, Cu, Zn, Cr, Mn, Ni, Ag, Ca, Na, K, In, Ga, Ge, V, Mo, Nb, Si, Ti, Zr, or a mixture of any two or more thereof; B is $O^{2-}$, $(P_2O_7)^{4-}$, $PO_4^{3-}$, or a mixture of any two or more thereof; x and y are from 1 to 4.

In some embodiments, the coating layer 503 within particle may be adjusted to have the same or different chemical composition on the surface of particles. In some embodiments, the distribution of the coating layer $A_xB_y$ is constant through the layer 503 for the cathode material 501. In some embodiments, the distribution of the coating layer, $A_xB_y$, 503 is varied for the cathode material 501. In some embodiments, the coating layer, $A_xB_y$, 503 is gradient change with the precursor composition for the cathode material 501.

In another aspect, electrodes, cells, and/or batteries prepared using the coated cathode material 501. In some embodiments, the method to make electrodes from the spherical lithiated cathode material 501 is provided for use in an electrochemical device. Typically, the electrodes made from the disclosed materials are cathodes (i.e. the positive electrode of an electrochemical cell). Exemplary electrochemical devices have at least a cathode; an anode; and a non-aqueous electrolyte. The non-aqueous electrolyte may be any conventional or otherwise suitable organic electrolyte known in the art. In some embodiments, the electrochemical device is a lithium secondary battery. In other embodiments, the cathode is a lithium metal oxide as described herein. In yet other embodiments, the anode is graphite, amorphous carbon, $Li_4Ti_5O_{12}$, a tin alloy, a silicon alloy, an intermetallic compound, lithium metal, or a mixture of any two or more such materials. Suitable graphitic materials may include, but are not limited to, natural graphite, artificial graphite, graphitized meso-carbon microbeads, graphite fibers, or a mixture of any two or more thereof, as well as any amorphous carbon materials. Also, typically in an electrochemical device, the anode and cathode are separated from each other by a porous separator.

Suitable non-aqueous electrolytes for use in the lithium ion batteries include an alkali metal salt and a polar aprotic solvent. In some embodiments, the alkali metal salt is a lithium salt, such as, but not limited to, $Li[B(C_2O_4)_2]$, $Li(C_2O_4)BF_2$, $Li[PF_2(C_2O_4)_2]$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof. The polar aprotic solvent may include, but is not limited to, ethylene carbonate, propylene carbonate, dimethyl carbonate, diethyl carbonate, ethyl methyl carbonate, dimethyl ether, gamma-butyrolactone, or a mixture of any two or more.

The present invention, thus generally described, will be understood more readily by reference to the following examples, which are provided by way of illustration and are not intended to be limiting of the present invention.

EXAMPLES

Example 1

FIGS. 6-12 shows graphical representations of the atomic ratios for metals in the precursors of the cathode active materials, and how they may vary with the diameter of the particles of the active materials. The precursors include generally spherical particles with the size between 10 μm to 20 μm. In all figures, the Y axis represents the concentration of different elements at a specific location in the spherical particle from the center to the surface. Distance 0 on the x axis represents the chemical composition of the particle at the core position (i.e. at the center of the particle). With increasing of the x value, the position is moving towards the surface direction, and eventually reaches the particle surface.

Figure 6A:
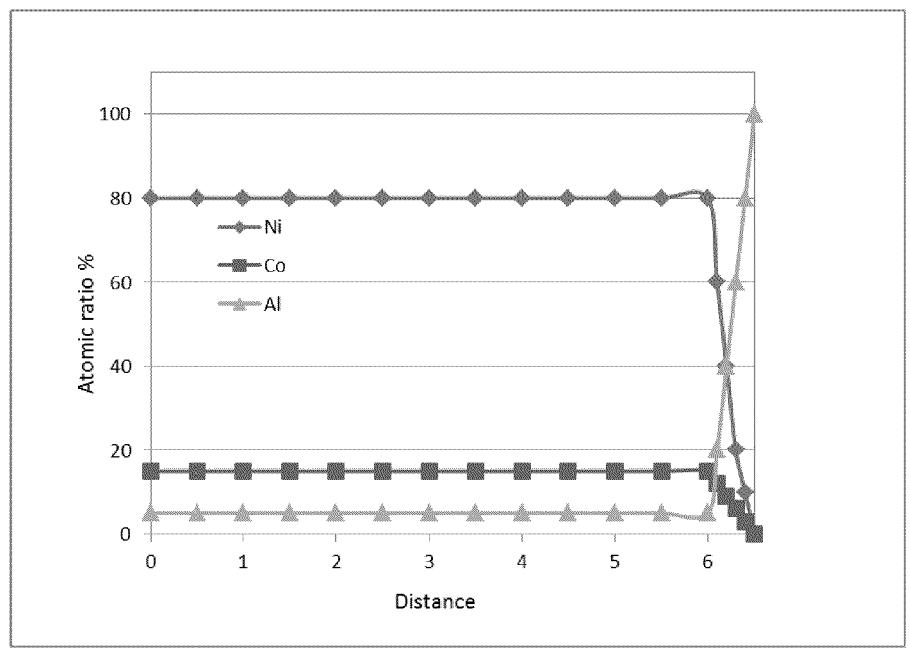
FIG. 6A is a graph illustration of a cathode precursor with a gradient coating layer at surface of a LiNi$_{0.8}$Co$_{0.15}$Al$_{0.05}$O$_2$ (NCA) particle.

FIG. 6A describes a cathode precursor with a gradient coating layer at surface of a $LiNi_{0.8}Co_{0.15}Al_{0.05}O_2$ (NCA) particle with size 13 μm. In this material, the chemical composition of the particle from core to 6 μm keeps constant as an NCA precursor, while from 6 μm to the particle surface, the Al amount increases gradually from 5% to 100%, and at the same time, Ni and Co amounts decrease gradually to 0%. On the surface, the Al is in an inactive coating layer for the NCA cathode material when lithiated.

Figure 6B:
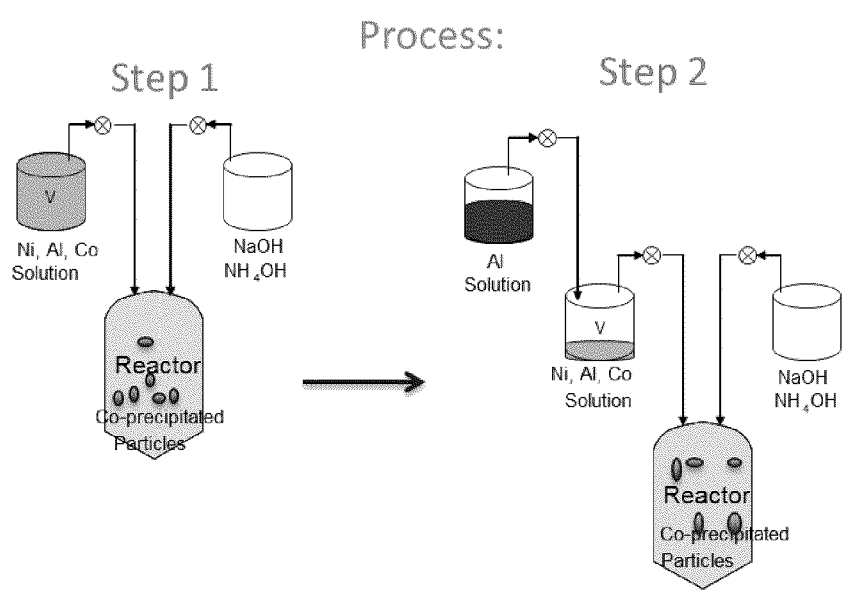
FIG. 6B is a schematic illustration of a co-precipitation process by CSTR to form a gradient coating layer at the surface of a particle precursor, according to the examples.

FIG. 6B describes the co-precipitation process by CSTR to form a gradient coating layer at the surface of an NCA particle precursor. The process includes two steps for the preparation of the precursor. Step 1 is to prepare a cathode active material precursor using co-precipitation method. Step 2 is to prepare the coating for the cathode material precursor using a precipitation method. Step 1 is carried out for 8 to 40 hours. At end of the step 1, step 2 was added over a short time (5 min to 1 hour). In this example, when the step 1 is completed, and the NCA precursor is formed, an Al-rich solution was fed into the first metal solution with stirring as in step 2. The Al concentration is gradually increased and fed into the reactor. This produces a particle having an Al concentration that increases as the concentration of the other metals decrease from core to outer surface of the precursor particles.

Figure 7A:
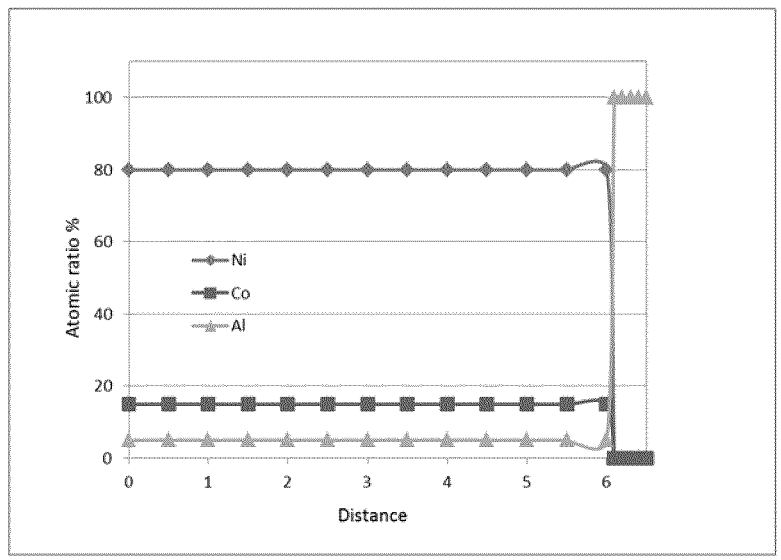
FIG. 7A is a graph illustrating a cathode precursor with a constant coating layer at surface of an NCA particle.

FIG. 7A describes a cathode precursor with a constant coating layer at surface of an NCA particle with a size of 13 µm. In this material, the chemical composition of the particle from core to 6 µm keeps constant as NCA precursor; while from 6 µm to the particle surface, the Al amount increases to 100%, and at the same time, Ni and Co amounts decrease to 0%. On the surface, Al is an inactive coating layered for the NCA cathode material when lithiated.

Figure 7B:
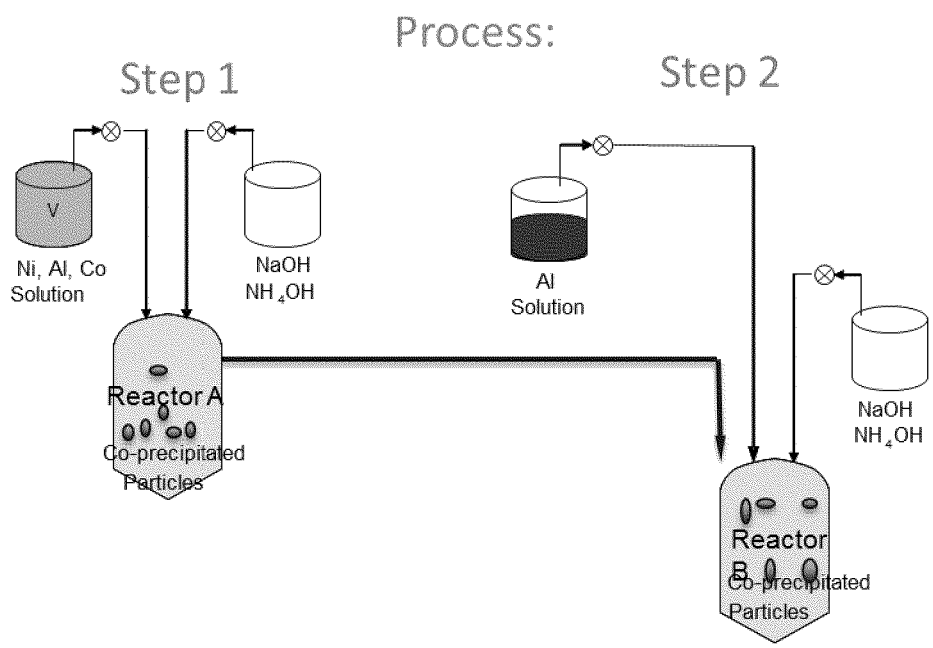
FIG. 7B is an illustration of a co-precipitation process by a CSTR to form the constant coating layer at surface of NCA particle precursor, according to the examples.

FIG. 7B describes one co-precipitation process by a CSTR to form the constant coating layer at surface of NCA particle precursor. The process includes two steps for the precursor preparation. Step 1 is to prepare a cathode material precursor using co-precipitation. Step 2 is to prepare the coating for the cathode material precursor using precipitation. Step 1 is carried out for 8 to 40 hours. At end of the step 1, step 2 was added over a short time (5 min to 1 hour). In this example, when the step 1 is completed, and the NCA precursor is formed, an Al-rich solution was fed into the first metal solution with stirring as in step 2. The Al concentration is gradually increased to 100% and fed into the reactor, while the other metals decreased to 0%.

Figure 8:
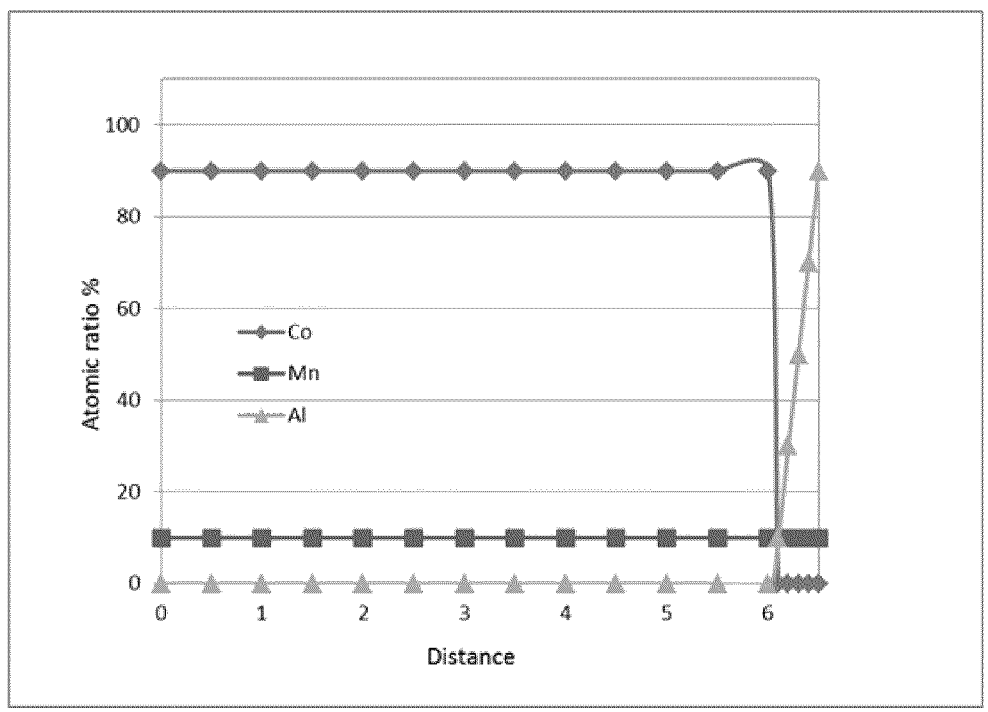
FIG. 8 is a schematic representation of coating on the cathode, according to the examples.

FIG. 8 describes a cathode active material precursor with a gradient coating layer at surface of particle with size 13 µm, and the ratio of metals in the composition (Co:Mn) of 9:1. In this material, the chemical composition of the particle from core to 6 µm keeps constant (Co:Mn=9:1) as the precursor; while from 6 µm to the surface of the particle, the Al amount increases to 90% and the Mn amount is maintained at 10%. On the surface, the Al is in an inactive coating layer for the cathode material when lithiated.

Figure 9:
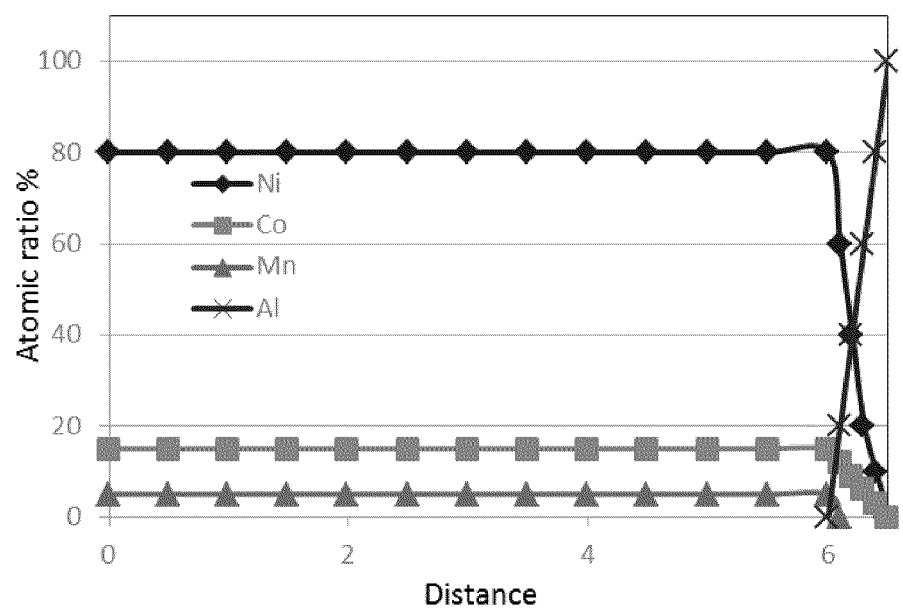
FIG. 9 is a schematic representation of constant coating on the cathode material, according to the examples.

FIG. 9 describes a cathode precursor with a gradient coating layer at surface of particle with size 13 µm, the ratio of metals in the composition (Ni:Co:Mn) is 80:15:5. In this material, the chemical composition of the particle from core to 6 µm keeps constant (Ni:Co:Mn=80:15:5) as precursor; while from 6 µm to the surface of the particle, the Al amount increases over a gradient to 100%, while the Ni, Co Mn amount decreases to 0%. On the surface, the Al is in an inactive coating layer for the cathode material when lithiated.

Figure 10:
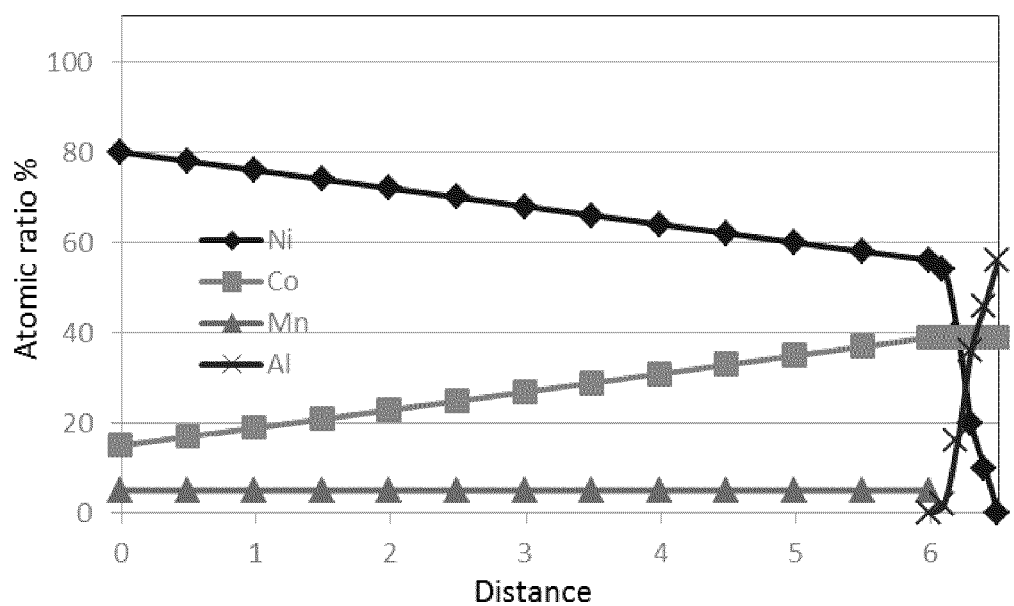
FIG. 10 is a schematic representation of gradient coating on the gradient cathode material, according to the examples.

FIG. 10 describes a cathode gradient precursor with a gradient coating layer at surface of particle with size 13 µm. From the core to 6 µm, the Ni decreases from 80% to 56%, Co increases from 16% to 40%, and Mn is constant at 4%. From 6 µm to the particle surface, the Al amount increases to 58% and the Ni amount decreases to 0%. On the surface, the Al is in an inactive coating layer for the cathode material when lithiated.

Figure 11:
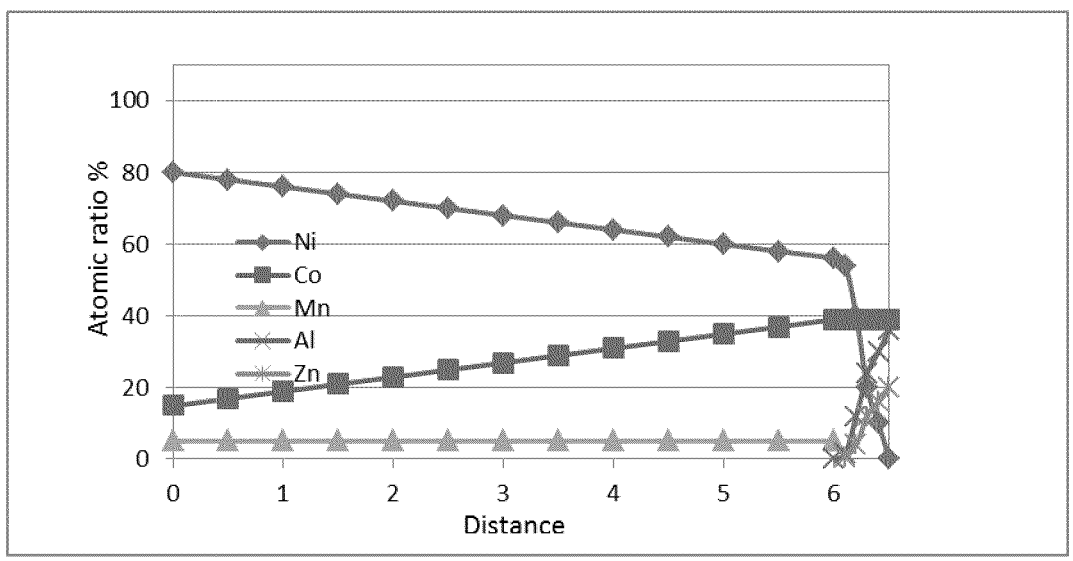
FIG. 11 is a schematic representation of gradient coating on the cathode material, according to the examples.

FIG. 11 describes a cathode gradient precursor with a gradient coating layer at surface of particle with size 13 µm. From the core to 6 µm, the Ni decreases from 80% to 56%, Co increases from 16% to 40%, and the Mn remains constant at 4%. From 6 µm to the particle surface, the Al and Zn amount increases to 38% and 20%, respectively, while the Ni amount decreases to 0%. On the surface, the Al is in an inactive coating layer for the cathode material when lithiated.

Figure 12:
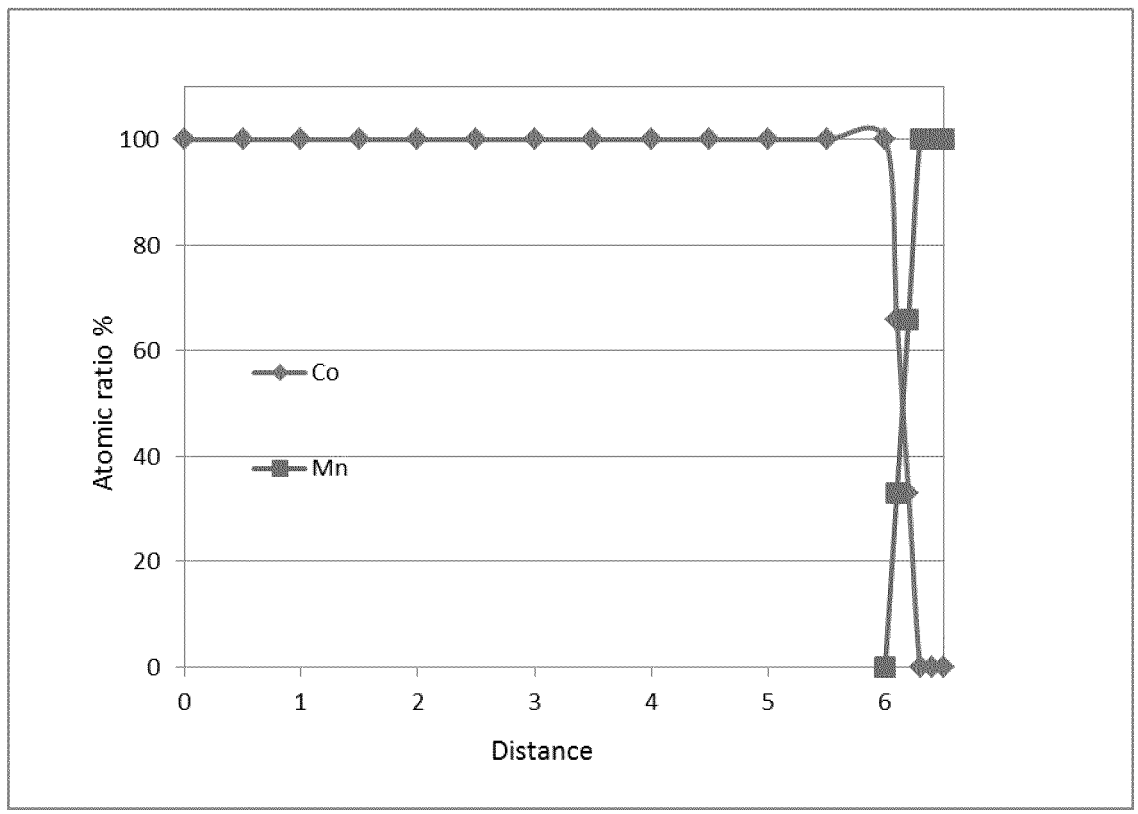
FIG. 12 is a schematic representation of coating on the cathode material, according to the examples.

FIG. 12 describes a cathode precursor with a gradient coating layer at surface of $LiCoO_2$ particle with size 13 µm. From core to 6 µm the composition is constant as a $LiCoO_2$ precursor; while from 6 µm to the particle surface, the Mn amount increases to 100%, and at the same time, the Co amount decreases to 0%. On the surface, the Mn is in an inactive coating layer for the cathode material when lithiated.

Example 2

A 4-liter CSTR was filled with distilled water and heated to 55° C. The water was purged with nitrogen while stirring at a rate of 1000 rpm. Then, a 2M aqueous solution of nickel and cobalt sulfate (Ni:Co is 16/3) and a 5M solution of aqueous ammonia were continuously dripped into a sealed reactor. The pH was fixed at 11.5 by adding a 10M aqueous solution of sodium hydroxide using a pH controller/pump. The particles nucleate and grow in the particulate solution for a 24-hour run time. The final precursor $Ni_{0.842}Co_{0.158}(OH)_2$ particles were washed, filtered and dried. The precursor was mixed with LiOH and calcined at 500° C. for 5 hours, ground, and further calcined at 875° C. for 12 hour in air.

Example 3

A 4-liter CSTR was filled with distilled water and heated to 55° C. The water was purged with nitrogen while stirring at a rate of 1000 rpm. Then, a 2M aqueous solution of nickel and cobalt sulfate (Ni:Co is 16/3) and a 5M solution of aqueous ammonia were continuously dripped into a sealed reactor. The pH was fixed at 11.5 by adding a 10M aqueous solution of sodium hydroxide using a pH controller/pump. The particles nucleate and grow in the particulate solution for a 24-hour run time. The precursor $Ni_xCo_y(OH)_2$ particles formed inside the reactor.

Figure 13:
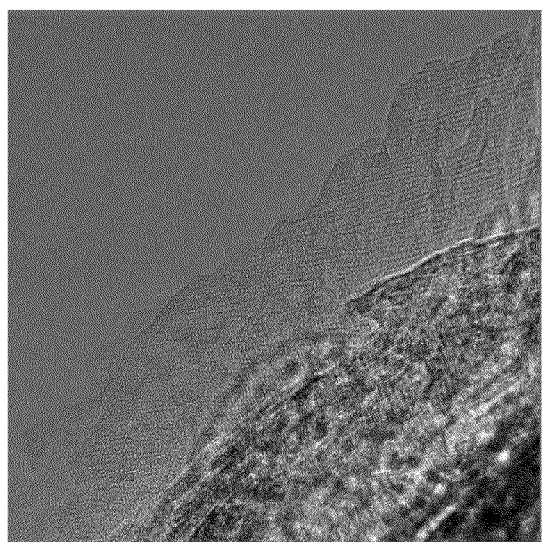
FIG. 13 is a TEM image of coated sample, according to the examples.

The $Ni_xCo_y(OH)_2$ was then coated with $Al(OH)_3$ using the following process. $Al(NO_3)_3$ solution was added to the reactor and the pH of the solution was controlled at 11. The composition obtained was $Ni_{0.8}Co_{0.15}(OH)_{1.9}$—$Al_{0.05}(OH)_{0.15}$. A TEM of the material is shown in FIG. 13. The TEM shows that Al is only on the surface of the precursor. The precursor particles were washed, filtered and dried. The final precursor was mixed with LiOH and calcined at 500° C. for 5 hours, ground, and subjected to 875° C. for 12 hours in air to form NCA (Ni—Co—Al).

Figure 14:
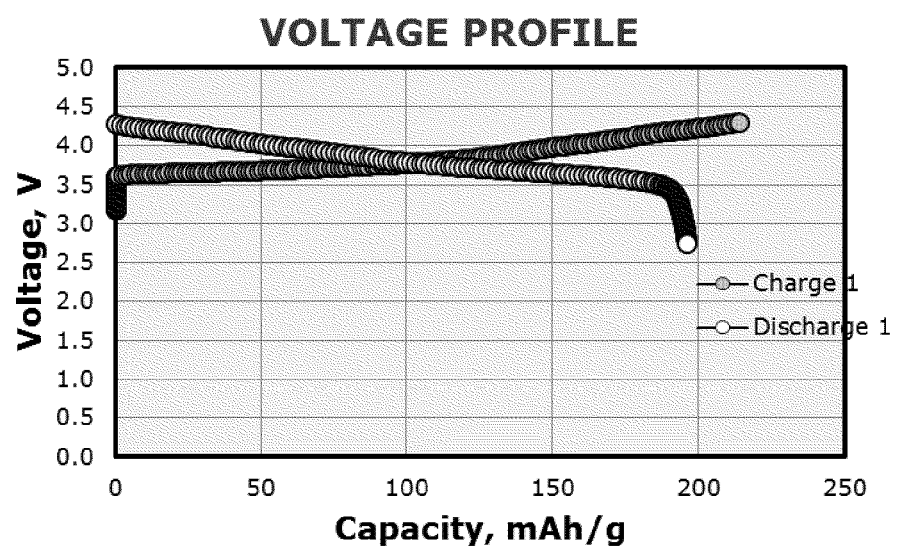
FIG. 14 is a graph of the initial charge and discharge curve of a coated material, according to the examples.
Figure 15:
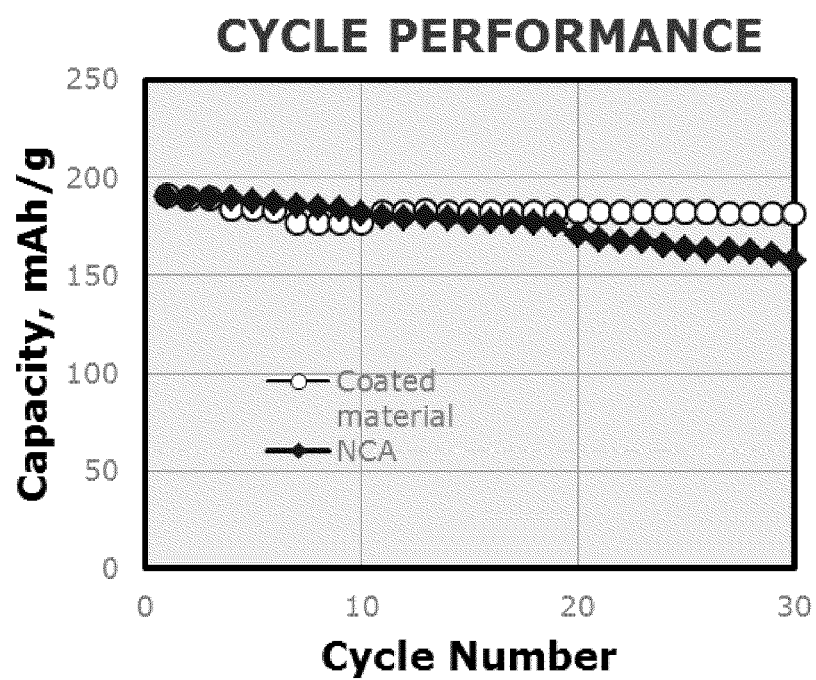
FIG. 15 is a graph of the cycle life of coated sample with NCA material, according to the examples.

An electrode was then prepared by coating a current collector with 90 wt % active material (NCA, from the above calcination), 5 wt % polyvinylidene difluoride (PVDF), and 5 wt % carbon black in 1-methyl-2-pyrrolidinone (NMP), and then removing the NMP. The electrode was then evaluated in a half-cell using Li metal as the anode, with an electrolyte of 1.2 M $LiPF_6$ in EC:EMC (3:7 in weight). The discharge and charge curves are shown in FIG. 14. FIG. 15 shows a comparison of the cycling life of coated NCA cathode active material in comparison to a non-coated, traditionally prepared NCA.

Example 4

A 4-liter CSTR was filled with distilled water and heated to 55° C. A gradient material was prepared by co-precipitation. The water was purged with nitrogen while stirring at a rate of 1000 rpm. Then two solutions (Solution A and B) of nickel, cobalt, and manganese sulfate solutions were prepared. Solution A (Ni:Co:Mn=8:1:1) was continuously feed into Solution B (Ni:Co=9:1), the sulfate solution B and a 5-molar solution of aqueous ammonia were continuously dripped into a sealed reactor. The pH was fixed at 11.5 by adding a 10M aqueous solution of sodium hydroxide using a pH controller/pump. The particles nucleate and grow in the particulate solution for a 24-hour run time. The control final precursor composition: core is $Ni_{0.9}Co_{0.1}(OH)_2$ with a shell of $Ni_{0.8}Co_{0.1}Mn_{0.1}(OH)_2$, with the precursor having a concentration gradient material from inner to outer, with the Ni is gradient decreasing, and the Mn gradient increasing. The final precursor particles were washed, filtered and dried. The precursor was then mixed with LiOH and calcined at 500° C. for 5 hours, ground, and again calcined at 875° C. for 12 hour in air.

Figure 16:
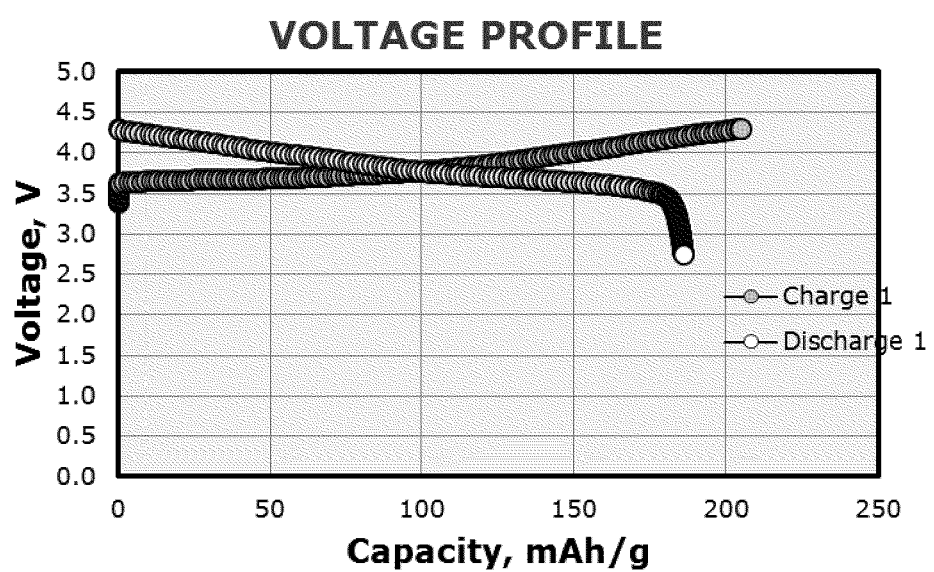
FIG. 16 is a graph showing the initial charge and discharge of a coated sample, according to the examples.

An electrode was then prepared by coating a current collector with 90 wt % active material (from the above calcination), 5 wt % polyvinylidene difluoride (PVDF), and 5 wt % carbon black in 1-methyl-2-pyrrolidinone (NMP), and then removing the NMP. The electrode was then evaluated in a half-cell using Li metal as the anode, with an electrolyte of 1.2 M $LiPF_6$ in EC:EMC (3:7 in weight). The discharge and charge curves are shown in FIG. 16.

Example 4

A 4-liter CSTR was filled with distilled water and heated to 55° C. A gradient material was prepared by co-precipitation. The water was purged with nitrogen while stirring at a rate of 1000 rpm. Then two solutions (Solution A and B) of nickel, cobalt, and manganese sulfate solutions were prepared. Solution A (Ni:Co:Mn=8:1:1) was continuously feed into Solution B (Ni:Co=9:1), the sulfate solution B and a 5-molar solution of aqueous ammonia were continuously dripped into a sealed reactor. The pH was fixed at 11.5 by adding a 10M aqueous solution of sodium hydroxide using a pH controller/pump. The particles nucleate and grow in the particulate solution for a 24-hour run time. The control final precursor composition: core is $Ni_{0.9}Co_{0.1}(OH)_2$ with a shell of $Ni_{0.8}Co_{0.1}Mn_{0.1}(OH)_2$, with the precursor having a concentration gradient material from inner to outer, with the Ni gradient decreasing, and the Mn gradient increasing. The final precursor particles were washed, filtered and dried. The precursor was then mixed with LiOH and calcined at 500° C. for 5 hours, ground, and again calcined at 875° C. for 12 hour in air.

The precursor particles were formed inside the reactor. The gradient precursor were then coated with $Al(OH)_3$ using the following process. $Al(NO_3)_3$ solution was added to the reactor and the pH of the solution was maintained at 11. The obtained composition has 2 wt % coating. The final $Al(OH)_3$ coated precursor particles were washed, filtered and dried. The coated precursor was mixed with LiOH and calcined at 500° C. for 5 hours, ground, and subjected to further calcination at 875° C. for 12 hours in air.

Figure 17:
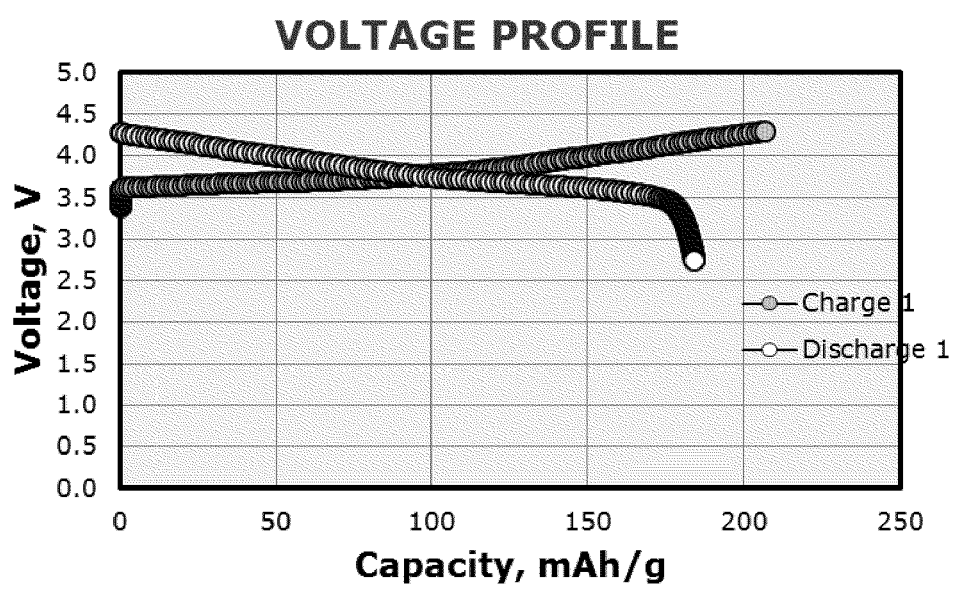
FIG. 17 is a graph of the initial charge and discharge of coated sample, according to the examples.
Figure 18:
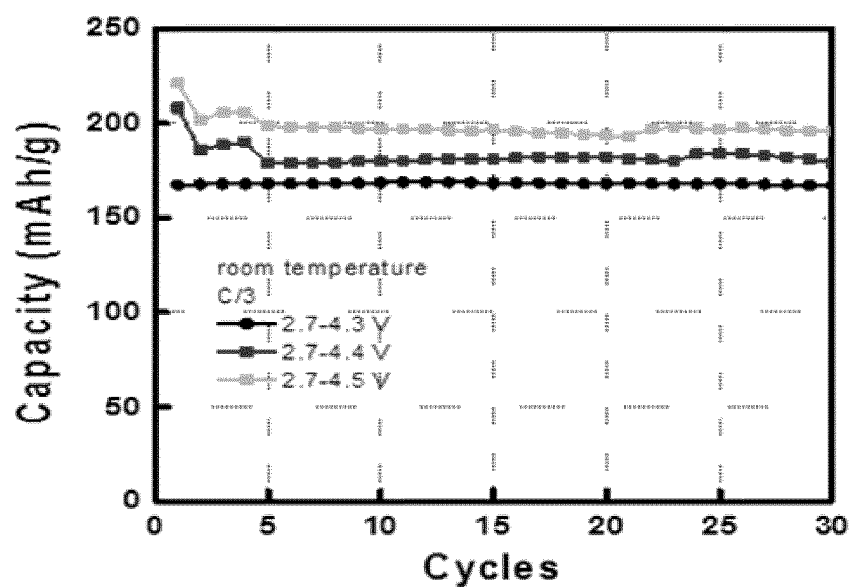
FIG. 18 is a graph of the cycle life of coated sample at different cut-off voltage, according to the examples.

An electrode was then prepared by coating a current collector with 90 wt % active material (from the above calcination), 5 wt % polyvinylidene difluoride (PVDF), and 5 wt % carbon black in 1-methyl-2-pyrrolidinone (NMP), and then removing the NMP. The electrode was then evaluated in a half-cell using Li metal as the anode, with an electrolyte of 1.2 M $LiPF_6$ in EC:EMC (3:7 in weight). The discharge and charge curves are shown in FIG. 17. Cycle life of the cell is shown in FIG. 18 at a different cut-off voltage.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process of forming a coated cathode active material particle, the process comprising:
   preparing a cathode active material precursor particle in aqueous solution, the preparing comprising:
     providing an aqueous acidic solution of a metal ion and an aqueous basic solution; and
     combining the aqueous basic solution and the aqueous acidic solution to effect co-precipitation of the cathode active material precursor as a particle;
     wherein a concentration of the metal ion is continuously increased or reduced during formation of the cathode active material precursor particle such that the cathode active material precursor contains an increasing or decreasing metal concentration along a radius of the particle;
   coating the cathode active material precursor particle in aqueous solution with a coating material precursor to form a coated cathode active material precursor particle wherein the coating material precursor comprises $Al(OH)_3$, $Al_2(CO_3)_3$, $Al_2(C_2O_4)_3$, $AlF_3$, $AlPO_4$, $Zr(OH)_4$, $Ti(OH)_4$, $Mg(OH)_2$, $Zn(OH)_2$, $ZnCO_3$, or $Zr(CO_3)_2$;
   lithiating or sodiating the coated cathode active material precursor particle in aqueous solution with a lithium or sodium source material to form a lithiated or sodiated coated cathode active material precursor particle;
   collecting the lithiated or sodiated coated cathode active material precursor particle; and
   sintering the lithiated or sodiated coated cathode active material precursor particle to form the coated cathode active material particle.

2. The process of claim 1, wherein the coating of the cathode active material precursor with the coating material comprises:
   providing an aqueous acidic solution of a first coating material precursor and an aqueous basic solution; and
   combining the aqueous basic solution and the aqueous acidic solution to effect precipitation of a second coating material precursor;
   wherein the second coating material precursor precipitates as a layer coating on individual particles of the cathode active material precursor to form the coated cathode active material precursor.

3. The process of claim 2, wherein a concentration of the first coating material precursor in the aqueous acidic solution increased or reduced during precipitation of the second electrochemically inert material precursor such that the layer of the second coating material precursor has an increasing or decreasing concentration along a radius of the layer.

4. The process of claim 1, wherein the coating material precursor is a precursor for an electrochemically active coating, and the cathode is coated with the electrochemically active coating.

5. The process of claim 1, wherein the coating material precursor is a precursor for an electrochemically inert coating, and the cathode is coated with the electrochemically inert coating.

6. The process of claim 1, wherein the cathode active material precursor comprises $Co(OH)_2$, $Ni(OH)_2$, $CoCO_3$, $MnCO_3$, $NiC_2O_4$, $FePO_4$, $Co_xNi_yMn_{1-x-y}(OH)_2$, $Co_xNi_yMn_{1-x-y}CO_3$, or $Co_xNi_yMn_{1-x-y}C_2O_4$.

7. The process of claim 1, wherein the coating material precursor comprises a metal hydroxide, a metal carbonate, a metal oxalate, a metal fluoride, a metal phosphate, or a metal oxyfluoride.

8. The process of claim 1, wherein a coating material comprises a metal oxide, a metal fluoride, a metal phosphate, or a metal oxyfluoride.

9. The process of claim 1, wherein the coating material comprises $Al_2O_3$, $ZrO_2$, MgO, ZnO, NiO, $MnO_2$, $TiO_2$, $MgF_2$, $CaF_2$, $AlF_3$, $AlPO_4$, $CoPO_4$, $Li_2MnO_3$, $LiAlO_2$, $LiV_3O_8$, or $Li_5FeO_4$.

10. The process of claim 1, wherein the coating material comprises $Al_2O_3$.

11. The process of claim 1 comprising the lithiating, wherein a lithium source material comprises lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, or lithium phosphate.

12. The process of claim 1 comprising the sodiating, wherein a sodium source material comprises sodium carbonate, sodium hydroxide, sodium nitrate, sodium acetate, sodium oxalate, sodium benzoate, sodium fluoride, sodium chloride, sodium bromide, sodium iodide, sodium oxide, sodium peroxide, sodium sulfate, sodium alloys, sodium silicate, sodium aluminate, or sodium phosphate.

13. The process of claim 1, wherein the cathode active material precursor particle comprises nickel and cobalt as the metal, and the coating material precursor comprises aluminum.

14. The process of claim 1, wherein preparing the cathode active material precursor particle comprises:
   providing the aqueous acidic solution comprises $M_xX_y$;
   during co-precipitation of the cathode active material precursor particle, adding $A_{x'}B_{y'}$ to effect co-precipitation of the coating material precursor;
   wherein:
     M is Ni, Co, Mn, Al, Mg, Fe, Cu, Zn, V, Mo, Nb, Cr, Si, Ti, Zr, or a mixture of any two or more thereof;
     X is $NO_3^-$, $SO_4^{2-}$, $CO_3^{2-}$, $PO_4^{3-}$, $F^-$, $Cl^-$, $Br^-$, $I^-$, or a mixture of any two more thereof;
     A is Li, Al, Mg, Fe, Cu, Zn, Cr, Mn, Ni, Co, Ag, Ca, Na, K, In, Ga, Ge, V, Mo, Nb, Si, Ti, Zr, or a mixture of any two or more thereof;
     B is $O^{2-}$, $F^-$, $O^-$, $Br^-$, $I^-$, $S^{2-}$, $N^{3-}$, $^-OH$, $CO_3^{2-}$, $C_2O_4^{2-}$, $(P_2O_7)^{4-}$, $PO_4^{3-}$, $SO_4^{2-}$ or a mixture of any two or more thereof;
     x, x', y, and y' are individually 1, 2, or 3; and
     wherein M and A are different.

15. The process of claim 14, wherein A is Al.

16. The process of claim 14, wherein a concentration of $M_xX_y$ is reduced during formation of the cathode active material precursor particle such that the cathode active material precursor particle contains a decreasing concentration along a radius of the particle, and a concentration of the $A_{x'}B_{y'}$ is increased during formation of the cathode active material precursor particle such that the coating material precursor contains an increasing concentration along a radius of the particle.

17. The process of claim 1, wherein the coated cathode active material precursor particle comprises Mn having a constant concentration along a radius of the particle, Ni having an increasing concentration along the radius of the particle, and Co having a decreasing concentration along the radius of the particle and the coating comprising aluminum.

18. The coated cathode active material particle produced by the process of claim 1.

19. The coated cathode active material particle of claim 18 comprising Mn having a constant concentration along a radius of the particle, Ni having an increasing concentration along the radius of the particle, and Co having a decreasing concentration along the radius of the particle and the coating comprising aluminum.

20. A cathode comprising the coated cathode active material particle of claim 18 and a binder.

21. An electrochemical device comprising the cathode of claim 20 and an anode.

* * * * *